(12) United States Patent
Gelfenbeyn et al.

(10) Patent No.: US 11,232,265 B2
(45) Date of Patent: *Jan. 25, 2022

(54) CONTEXT-BASED NATURAL LANGUAGE PROCESSING

(71) Applicant: Google LLC, Mountain View, CA (US)

(72) Inventors: Ilya Gennadyevich Gelfenbeyn, Sunnyvale, CA (US); Artem Goncharuk, Mountain View, CA (US); Pavel Aleksandrovich Sirotin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/686,257

(22) Filed: Nov. 18, 2019

(65) Prior Publication Data

US 2020/0081976 A1 Mar. 12, 2020

Related U.S. Application Data

(63) Continuation of application No. 15/063,757, filed on Mar. 8, 2016, now Pat. No. 10,482,184.

(60) Provisional application No. 62/129,877, filed on Mar. 8, 2015.

(51) Int. Cl.
| | | |
|---|---|---|
| *G10L 15/22* | (2006.01) | |
| *G06F 40/35* | (2020.01) | |
| *G10L 15/26* | (2006.01) | |
| *G06F 40/279* | (2020.01) | |

(52) U.S. Cl.
CPC ............ *G06F 40/35* (2020.01); *G06F 40/279* (2020.01); *G10L 15/22* (2013.01); *G10L 15/26* (2013.01); *G10L 2015/228* (2013.01)

(58) Field of Classification Search
CPC .... G06F 40/35; G06F 40/279; G06F 17/2765; G10L 15/26; G10L 15/22; G10L 2015/228; G10L 13/08; G10L 2015/223; G10L 15/1822; G10L 15/083; G10L 15/142; G10L 13/10; G10L 15/08; G10L 15/1815; G10L 15/20; G10L 15/222; G10L 15/265; G10L 2015/227; G10L 21/10; G10L 25/30; G10L 25/63
See application file for complete search history.

(56) References Cited

U.S. PATENT DOCUMENTS

| | | |
|---|---|---|
| 6,044,347 A | 3/2000 | Abella et al. |
| 6,144,938 A | 11/2000 | Surace et al. |
| 6,567,805 B1 | 5/2003 | Johnson et al. |

(Continued)

*Primary Examiner* — Abdelali Serrou
(74) *Attorney, Agent, or Firm* — Middleton Reutlinger

(57) ABSTRACT

A method for context-based natural language processing is disclosed herein. The method comprises maintaining a plurality of dialog system rules, receiving a user request from a Dialog System Interface, receiving one or more attributes associated with the user request from the Dialog System Interface or a user device, and identifying a type of context associated with the user request based on the user request and the one or more attributes. A context label is assigned to the user request associated with the type of context. Based on the context label and the user request, a particular dialog system rule is selected from the plurality of dialog system rules. A response to the user request is generated by applying the dialog system rule to at least a part of the user request.

20 Claims, 18 Drawing Sheets

(56) References Cited

U.S. PATENT DOCUMENTS

| | | |
|---|---|---|
| 6,907,546 B1 | 6/2005 | Haswell |
| 9,852,136 B2 | 12/2017 | Venkataraman et al. |
| 10,241,752 B2* | 3/2019 | Lemay .................. G06Q 50/10 |
| 2003/0028498 A1 | 2/2003 | Hayes-Roth |
| 2003/0171925 A1 | 9/2003 | Werner |
| 2004/0006483 A1 | 1/2004 | Sasaki et al. |
| 2004/0193421 A1 | 9/2004 | Blass |
| 2005/0033582 A1 | 2/2005 | Gadd et al. |
| 2005/0080628 A1 | 4/2005 | Kuperstein |
| 2006/0217978 A1 | 9/2006 | Mitby et al. |
| 2007/0198272 A1 | 8/2007 | Horioka et al. |
| 2012/0016678 A1* | 1/2012 | Gruber ...................... G06F 9/54 704/275 |
| 2012/0022872 A1* | 1/2012 | Gruber ................... G06F 3/167 704/270.1 |
| 2012/0265528 A1* | 10/2012 | Gruber ................. G10L 15/183 704/235 |
| 2013/0080173 A1 | 3/2013 | Talwar et al. |
| 2013/0275164 A1* | 10/2013 | Gruber .................... G10L 17/22 705/5 |
| 2013/0275875 A1* | 10/2013 | Gruber .................... H04L 67/12 715/728 |
| 2013/0275899 A1* | 10/2013 | Schubert ................ B60K 35/00 715/765 |
| 2013/0346077 A1 | 12/2013 | Mengibar et al. |
| 2014/0074483 A1* | 3/2014 | van Os ................... G06F 3/167 704/275 |
| 2014/0156277 A1* | 6/2014 | Fujii ....................... G10L 15/26 704/251 |
| 2014/0180697 A1* | 6/2014 | Torok .................. G06F 16/3344 704/275 |
| 2014/0195252 A1* | 7/2014 | Gruber .................... G10L 15/22 704/275 |
| 2014/0223011 A1 | 8/2014 | Smith et al. |
| 2014/0278444 A1* | 9/2014 | Larson .................... G10L 15/22 704/275 |
| 2014/0365209 A1* | 12/2014 | Evermann ............... G06F 40/35 704/9 |
| 2014/0365216 A1* | 12/2014 | Gruber ................. G10L 15/063 704/235 |
| 2015/0206533 A1 | 7/2015 | Jin et al. |
| 2015/0379989 A1* | 12/2015 | Balasubramanian ........................ G06Q 30/0269 704/233 |
| 2016/0365209 A1* | 12/2016 | Blackmon ........... H01H 50/045 |

* cited by examiner

NewAgent » Entities » city

Create Entity ▷ city ✎

ⓘ Separate synonyms by pressing enter or ; key

| New York | Big Apple | Enter synonym ... | | New York, NY, USA |
| Washington | DC | Enter synonym ... | | Washington, DC, USA |
| Paris | Enter synonym ... | | | Paris |
| Enter synonym ... | | | | Enter reference value ... |
| Enter synonym ... | | | | Enter reference value ... |

+ Add a row

Save | Save & Close | | | Cancel

Try it now...

Please use test console above to try a sentence

710 — List of synonyms

720 — Singular reference value/canonical value for a given entity value

Weather - What about @city

[ X ] [ weather ]   Add input context...

[ X ] [ weather ]   Add output context...

💬 User says                    Machine learning ⬤

> What about New York

> Tell me about Toronto

| Parameter name | Entity | Value |
| --- | --- | --- |
| Geo-city | @sys.geo-city | Toronto |

> And now for @sys.geo-city:geo-city

+ Add

🛠 Action weather

| Required | Parameter name | Entity | Value |
| --- | --- | --- | --- |
| ☐ | geo-city | @sys.geo-city | $geo-city |
| ☐ | Enter name... | Enter entity... | Enter value... |

FIG. 14

Weather - What about @city

[X] [weather]  Add input context...

[X] [weather]  Add output context...

Lifespan: 5

*Specify context lifespan in requests. 0 lifespan removes a context.*

Delete

User s...                                          Machine learning ●

> What about New York

> Tell me about Toronto

| Parameter name | Entity | Value |
|---|---|---|
| Geo-city | @sys.geo-city | Toronto |

> And now for @sys.geo-city:geo-city

+ Add

Action weather

| Required | Parameter name | Entity | Value |
|---|---|---|---|
| ☐ | geo-city | @sys.geo-city | $geo-city |
| ☐ | Enter name... | Enter entity... | Enter value... |

FIG. 15

CONTEXT-BASED NATURAL LANGUAGE PROCESSING

TECHNICAL FIELD

This disclosure relates generally to dialog systems. More particularly, this disclosure relates to natural language processing (NLP) methods that involve multimodal processing of user requests. These methods allow processing user requests, which are not reasonably understandable if taken alone or in isolation, by identifying a speech or environmental context that encompasses the user requests.

BACKGROUND

Conventional dialog systems are widely used in the information technology industry, especially in the form of mobile applications for wireless telephones and tablet computers. Generally, a dialog system refers to a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "dialog system" for simplicity.

Traditionally, a dialog system interacts with its users in natural language to simulate an intelligent conversation and provide personalized assistance to the users. For example, a user may generate requests to the dialog system in the form of conversational questions, such as "Where is the nearest hotel?" or "What is the weather like in Alexandria?," and receive corresponding answers from the dialog system in the form of audio and/or displayable messages. The users may also provide voice commands to the dialog system requesting the performance of certain functions including, for example, generating e-mails, making phone calls, searching particular information, acquiring data, navigating, requesting notifications or reminders, and so forth. These and other functionalities make dialog systems very popular as they are of great help, especially for holders of portable electronic devices such as smart phones, cellular phones, tablet computers, gaming consoles, and the like.

Although dialog systems are a popular tool in day-to-day errands, there are still a number of user requests that conventional dialog systems cannot correctly process. Namely, traditional dialog systems cannot accurately process user requests that are not generally understandable out of speech or environmental context. In one example, a first user request "What is the weather like in New York'?" is generally understandable, and traditional dialog systems are typically able to process such a request and provide a corresponding response. However, if the user makes the second user request "What about Los Angeles?" right after receiving the response to the first user request, the second user request will not be correctly processed by conventional dialog systems as long as each user request is processed independently.

In another example, when a dialog system installed on a mobile device is used for controlling internal mobile applications, some user commands may not be understandable by the dialog system. For instance, the verbal user command "Next" may mean different actions in different mobile applications. In one application, it can mean opening a next page, while in another application it may mean moving a pointer to a next list item, and so forth.

Moreover, dialog systems may not correctly process user commands when a physical environment is changed. For example, when a user travels from one time zone to another one, user commands associated with timing, such as "what time is it" questions, may not be correctly processed because the dialog system may be linked to a particular time zone, territory, or other factors.

Based on the foregoing, it can be inconvenient or annoying to users when conventional dialog systems either do not process or inaccurately process at least some of user requests. Therefore, there is a long felt need in improving responding by conventional dialog systems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology provides for a dialog system that can accurately process user requests that are generally not understandable out of speech and/or environmental context. The present technology also provides for an online platform for creating custom Dialog System Engines and context databases associated therewith.

Generally speaking, the present technology allows for identifying contexts related to particular user requests and processing of the user requests using a Dialog System Engine based on the identified contexts. Contexts may refer to speech contexts, which are based on a sequence of prior user requests or dialog system answers. Contexts may also refer to environmental contexts, which are based on geographical locations, weather conditions, user actions, user motions, directions, and so forth. The environmental contexts may also be associated with multi-modal interfaces, i.e., where speech is used in addition to displayed graphics and touch inputs, and a dialog can be partly defined not by speech, but by other means of input (touch, clicks, and so forth). Environmental contexts allow integrating speech interfaces into multi-modal environments in a way most convenient for the end users. For example, an end user may start an interaction by a touch, continue via voice, and finish via clicks (e.g., in the car—voice, steering wheel controls, touch controls on infotainment center).

According to some example aspects of the present disclosure, there is provided a dialog system, which includes a Dialog System Engine running on a server and a Dialog System Interface running on a client side. The Dialog System Engine maintains a plurality of dialog system rules stipulating instructions on how the Dialog System Engine shall respond to a particular user request received from the Dialog System Interface. In some embodiments, the dialog system rules include intents for describing dialog steps and extraction of information during execution of the dialog steps. The dialog system rules can be implemented by using machine learning classifiers, rule engines, heuristics algorithms, and so forth. The Dialog System Engine also maintains a context database for speech and environment contexts. Speech context can include one or more context expressions associated with at least one dialog system rule. For example, some context expressions may relate to terms, keywords, phrases and/or questions virtually linked with a certain 'entity' (i.e., a dialog system element as explained below). Environmental context can be defined by the device of the user, user profile, geographical location, environmental conditions, and so forth. The environmental context can be either an attribute of the user session with the dialog system or passed by a host system to the dialog system engine. For example, a car can send its geographical location, and moving or parking status to the dialog system engine, and dialog system responses can be based on the identified environmental context.

In operation, the Dialog System Engine receives user requests acquired by the Dialog System Interface. User requests can optionally be pre-processed. For example, the Dialog System Interface can recognize spoken words and transform audio user input into a text-based user input. Further, the Dialog System Engine processes the user request by applying one of the dialog system rules or a statistics-based dialog system responding scheme. If the Dialog System Engine determines that the user request cannot be understood out of context, the Dialog System Engine identifies a context stored in the context database that relates to at least a portion of the user request. Further, the Dialog System Engine selects, from the plurality of dialog rules or responding schemes, a particular dialog system rule or responding scheme, which is associated with the identified context, and generates a response to the user request by applying the selected dialog system rule or responding scheme to at least a part of the user request. The Dialog System Engine transfers the response to, or causes the Dialog System Interface to present the response to, the user.

The term "context," in this disclosure, refers to conversational context and/or environmental context. The conversational context relates to a dialog between the user and the dialog system. The environmental context relates to one or more of the following: mobile or software applications currently running on a client side, a type of user device used (e.g., mobile phone, tablet computer, laptop computer, in-vehicle computer), and current physical conditions associated with the user (geographical location, weather, time, movement, motion, speed, direction, etc.), information stored in the user's profile, state of the graphical user interface (GUI) currently running on the client side, and the like. In some aspects of the present disclosure, the platform allows application developers to create custom Dialog System Engines including specific dialog system rules and a statistics-based dialog system responding scheme, and associate them with custom context database elements.

Therefore, the present technology improves accuracy of processing user requests by dialog systems including even such user requests that are not generally understandable out of context. The present technology also allows for enabling multi-modal dialog system interactions. Additional objects, advantages, and novel features will be set forth in part in the detailed description that follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which:

FIG. 7 shows the process of manual creating of entities via the platform interface, in accordance with some example embodiments.

FIG. 14-18 show a process of manual creation of contexts for a dialog system rule, in accordance with some example embodiments.

DETAILED DESCRIPTION

Figure 1:
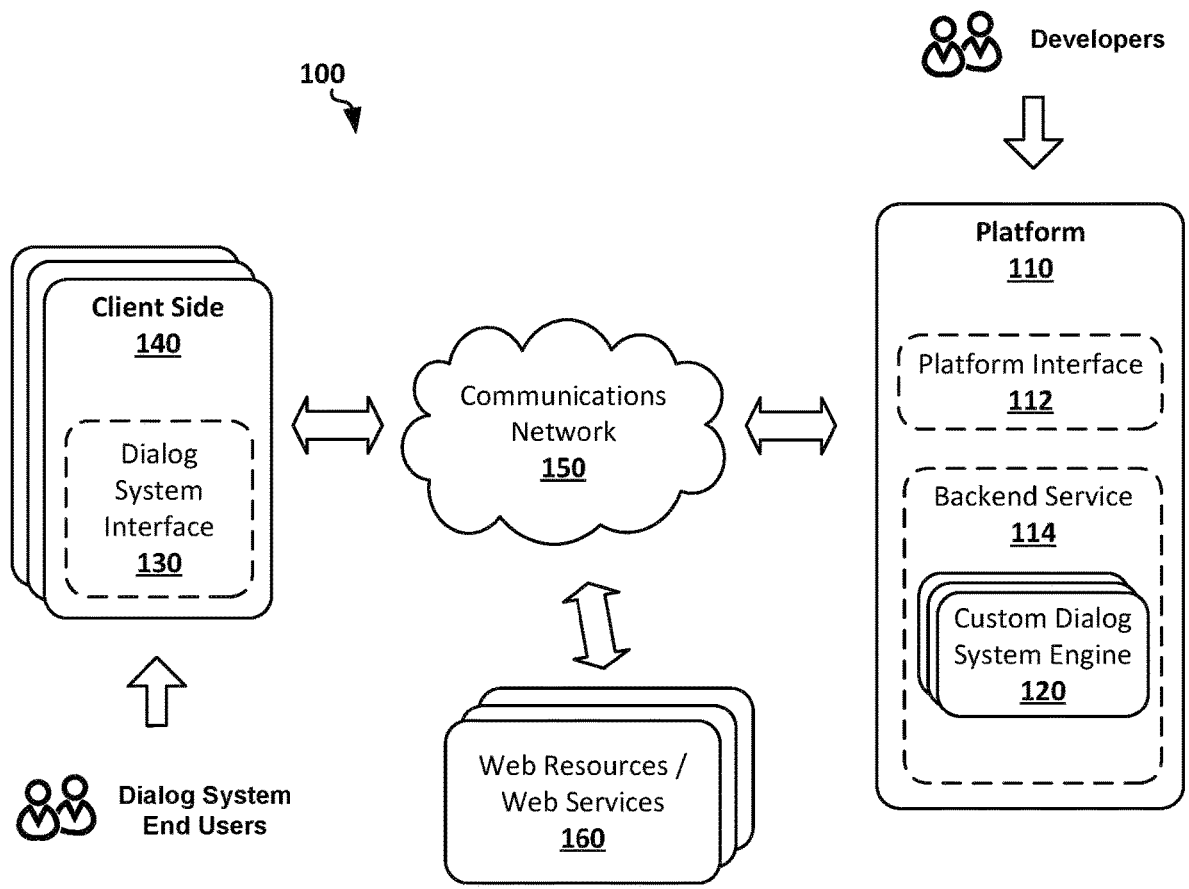
FIG. 1 illustrates an environment within which systems and methods for context-based NLP can be implemented, in accordance with some embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The term "application developer" or simply "developer" refers to one or more of the following: software developer, mobile application developer, software engineer, software owner, mobile application owner, software manager, mobile application manager, dialog system owner, and so forth. An application developer develops and/or manages a Dialog System Engine and/or Dialog System Interface.

The term "Dialog System" refers to one or more of the following: chat information system, spoken dialog system, conversational agent, chatter robot, chatterbot, chatbot, chat agent, digital personal assistant, automated online assistant, and so forth. Each Dialog System includes "Dialog System Interface" and "Dialog System Engine." Each of these elements can be customized by an application developer.

The term "Dialog System Interface" refers to a computer-human interface, which is configured to acquire user inputs in the form of audio messages or text messages, and deliver dialog system responses to the users in the form of audio messages or displayable messages. In one example, a Dialog System Interface may be implemented as a widget employed to or integrated with a software application, mobile application, middleware application, firmware application, website, and web service, to provide a computer-human interface for acquiring user requests and delivering dialog system outputs to the users.

The term "Dialog System Engine" refers to a software application, which is configured to process user inputs and generate responses thereto. In one example, Dialog System Engine refers to a computer-enabled or processor-enabled system for supporting an associated Dialog System Interface by processing user requests and generating corresponding responses thereto.

As outlined above, the present technology provides for a platform enabling the creation and maintaining of custom Dialog System Engines serving as backend services for custom Dialog System Interfaces. A Dialog System Engine and Dialog System Interface, when interacting with each other, form a dialog system. One may refer to a Dialog System Interface running on or accessed from a client device as a "frontend" user interface, while a Dialog System Engine, which supports the operation of such a Dialog System Interface, can be referred to as a "backend" service. The present technology also provides for Dialog System Engines that are configured to accurately process user requests that are not generally understandable out of context.

The platform, according to embodiments of the present disclosure, allows developers to create custom Dialog System Engines that will support frontend Dialog System Interfaces. For example, if a developer wants to integrate dialog system functionality into a mobile application as an additional feature, the developer can use the platform to create and deploy a custom Dialog System Engine and link it with the mobile application. The mobile application, in turn, will have only a Dialog System Interface. In this example, the Dialog System Interface can be activated by a user when he interacts with the mobile application. The user can make inquiries to the Dialog System Interface in the form of voice inputs or text inputs. Upon receipt of a user inquiry, the Dialog System Interface can transfer the user inquiry with little or no pre-processing to the linked custom Dialog System Engine. The custom Dialog System Engine processes the received user inquiry, interprets it, and generates a response to the inquiry based on predetermined rules and settings. The response may be delivered back to the Dialog System Interface for further visual or audio presentation to the user.

Dialog System Interfaces can be integrated or be an integral part of a wide range of software applications running on a client device, such as personal computer (PC) or cellular phone, or on a server so that the dialog systems become a part of a website or web service. Dialog System Engines can be implemented on a server such that their functionalities can be accessible to Dialog System Interfaces over the Internet, cellular networks, or any other communications means. In additional embodiments, a Dialog System Interface and Dialog System Engine run on a single device (i.e., a PC or mobile application).

According to some embodiments, Dialog System Interfaces can be also configured to determine contexts associated with one or more user requests. For example, Dialog System Interfaces can determine a current geographical location of the user, type of user device used, current time, date, currently used mobile or software applications, and so forth. Similarly, Dialog System Engines can also determine contexts associated with one or more user requests. For example, Dialog System Engines can determine conversational contexts by analyzing consequences of user requests. In some instances, Dialog System Engines can also determine environmental contexts in addition to conversational contexts.

FIG. 1 shows a high-level block diagram of example system environment 100 suitable for practicing the present technologies. As can be seen on this figure, there is provided platform 110 for creating and maintaining custom Dialog System Engines. For these ends, platform 110 includes platform interface 112 for online creation and managing of custom Dialog System Engines and backend service 114 for maintaining and running custom Dialog System Engines 120.

Platform interface 112 may include a GUI embedded into a webpage and accessible by developers via the Internet. In some other embodiments, however, platform interface 112 may be implemented as a software application such as a downloadable software application or any other software, middleware, or firmware running on or accessible from an electronic device such as a computer. In the example shown in FIG. 1, platform interface 112 is realized as a web accessible GUI as will be described below. For simplicity, this disclosure is limited to such embodiments where platform interface 112 is a server-based solution so that it is accessible via the Internet. Regardless of a particular implementation, platform interface 112 enables developers through a number of GUI tools to create one or more custom Dialog System Engines 120.

Still referencing to FIG. 1, backend service 114 is responsible for maintaining and running custom Dialog System Engines 120 that are created, for example, by or with the help of platform interface 112. Backend service 114 may operate as a web service providing functionality to custom dialog systems by enabling their Dialog System Interfaces to interact with custom Dialog System Engines 120 maintained at backend service 114.

As briefly discussed above, Dialog System Interfaces 130 can be provided on a client side 140. Dialog System Interfaces 130 may be as simple as a GUI enabling users to make inquiries, which are then delivered to backend service 114 for processing by corresponding Dialog System Engines 120, and to receive responses to the inquires generated by Dialog System Engines 120. Dialog System Interfaces 130 may be implemented as stand-alone software applications or they can be an integral part of a software application, web service, website, and the like.

Still referencing to FIG. 1, client side 140 may refer to, but is not limited to, a user device, terminal, computing device (e.g., laptop computer, tablet computer, desktop computer), cellular phone, smart phone, gaming console, remote control, multimedia system, smart television device, set-top box, infotainment system, in-vehicle computing device, informational kiosk, robot, and so forth. In these embodiments, Dialog System Interfaces 130 may be implemented as software, middleware, or firmware installed on such devices.

In additional embodiments, client side 140 may refer to a networked or online solution such as a server, hosting service, web service, web site, cloud service, and so forth. For example, Dialog System Interface 130 can be a widget or GUI provided on one or more web pages enabling end users to make inquires and get responses thereto. This option is suitable for those instances when a developer, for example, wants to integrate a dialog system into his website to provide enhanced customer service.

As can be seen in FIG. 1, the interaction between Dialog System Interfaces 130 and corresponding Dialog System Engines 120 is performed via a communications network 150. Communications network 150 may include one or more of the Internet, intranet, cellular network, local area network (LAN), wide area network (WAN), IEEE 802.11 based network, and so forth.

FIG. 1 also shows various third party web resources/services 160 provided via one or more web servers. These third party web resources/services 160 can provide information of various types to Dialog System Engines 120 or Dialog System Interfaces 130 as a part of a response to a user request. For example, web resources/services 160 may refer to email services, weather services, navigation services, and the like. Accordingly, if a user makes the inquiry "What is the weather like today?," such information may be automatically acquired by Dialog System Engine 120 from one or more third party web resources/services 160 and then integrated into a dialog system response to be delivered to the end user.

Figure 2:
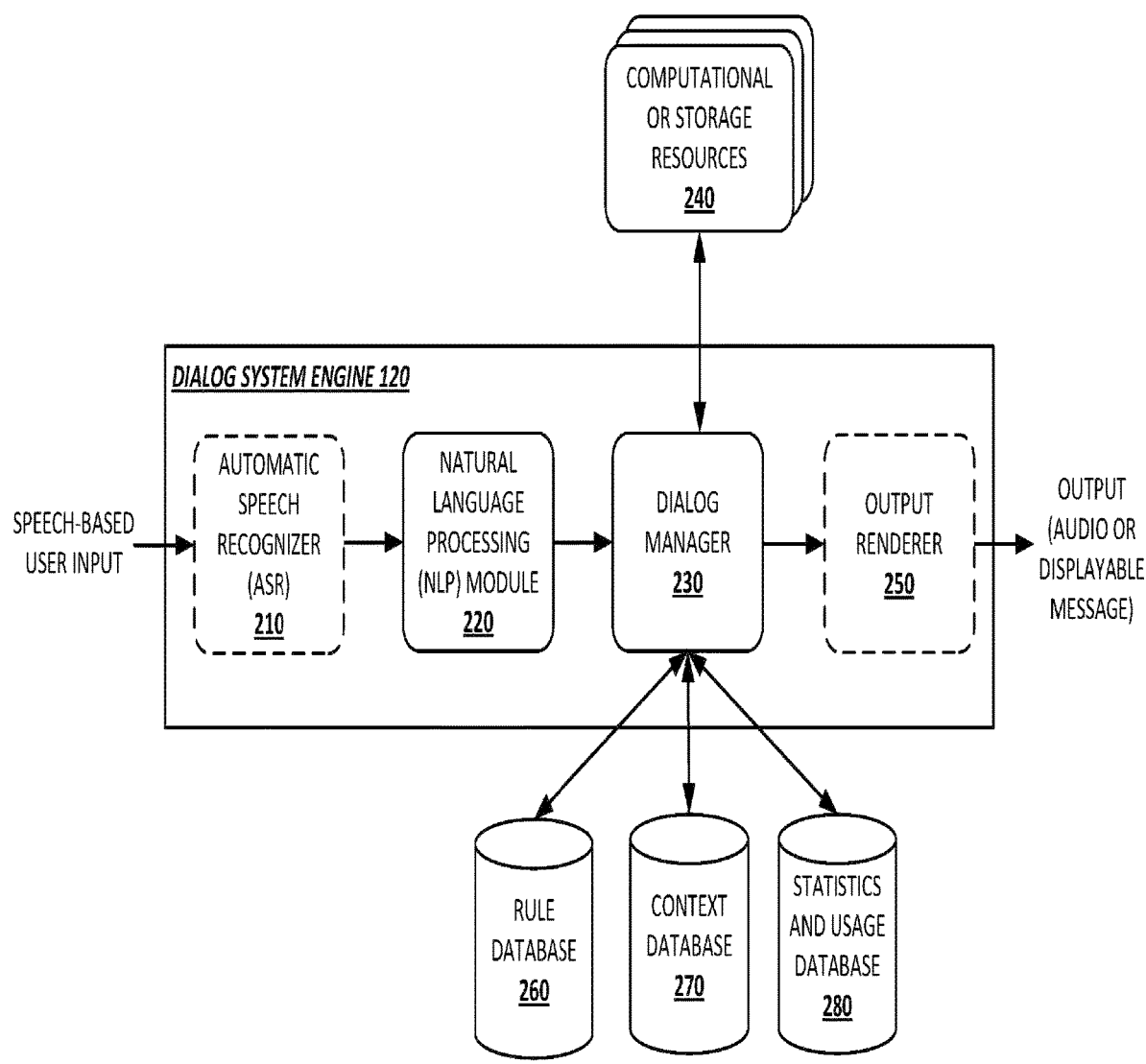
FIG. 2 is a block diagram showing various modules of a dialog system engine, in accordance with certain embodiments.

FIG. 2 shows a high-level architecture of exemplary Dialog System Engine 120, according to an example embodiment. It should be noted that every module of Dialog System Engine 120 or associated architecture includes hardware components, software components, or a combination thereof. Dialog System Engine 120 may be embedded or installed in a user device or server, or may be presented as a cloud computing module and/or a distributed computing module. The system for context-based natural language processing may be implemented as a part of Dialog System Engine 120.

In the embodiment shown, Dialog System Engine 120 includes optional Automatic Speech Recognizer (ASR) 210 configured to receive and process speech-based user inputs into a sequence of parameter vectors. ASR 210 further converts the sequence of parameter vectors into a recognized input (i.e., a textual input having one or more words, phrases, or sentences). ASR 210 includes one or more speech recognizers such as a pattern-based speech recognizer, free-dictation recognizer, address book based recognizer, dynamically created recognizer, and so forth. In some embodiments, ASR 210 is used not in Dialog System Engine 120, but in Dialog System Interface 130.

Further, Dialog System Engine 120 includes NLP module 220 for understanding spoken language input. Specifically, NLP module 220 may disassemble and parse the recognized input to produce utterances, which are then analyzed utilizing, for example, morphological analysis, part-of-speech tagging, shallow parsing, and the like. NLP module 220 may then map recognized input or its parts to meaning representations.

Dialog System Engine 120 further includes dialog manager 230, which coordinates the activity of all components, controls dialog flows, and communicates with external applications, devices, services, or resources. Dialog manager 230 may play many roles, which include discourse analysis, knowledge database query, and system action prediction based on the discourse context.

In some embodiments, dialog manager 230 may contact one or more task managers (not shown) that may have knowledge of specific task domains. In some embodiments, dialog manager 230 may communicate with various computing, logic, or storage resources 240, which may include, for example, a content storage, rules database, recommendation database, push notification database, context database, electronic address book, email or text agents, dialog history database, disparate knowledge databases, map database, points of interest database, geographical location determiner, clock, wireless network detector, search engines, social networking websites, blogging websites, news feed services, and many more. In some embodiments, computational or storage resources 240 include one or more web resources/services 160 discussed above.

Dialog manager 230 may employ multiple disparate approaches to generate outputs in response to recognized inputs. Some approaches include the use of predetermined rules, statistical analysis, machine-learning algorithms (e.g., neural networks), heuristic analysis, and so forth. Dialog manager 230 is one of the central components of Dialog System Engine 120. The major role of dialog manager 230 is to select the correct system actions based on observed evidences and inferred dialog states from the results of NLP (e.g., dialog act, user goal, and discourse history). In addition, dialog manager 230 may be able to handle errors when the user input has ASR and NLP errors caused by noises or unexpected inputs.

Dialog System Engine 120 further includes optional output renderer 250 for transforming the output of dialog manager 230 into a form suitable for providing to the user. For example, output renderer 250 may employ a text-to-speech engine or may contact a pre-recorded audio database to generate an audio message corresponding to the output of dialog manager 230. In certain embodiments, output renderer 250 may present or cause to present the output of dialog manager 230 as a text message, image, or video message for further displaying on a display screen of a user device. In some embodiments, output renderer 250 is provided not in Dialog System Engine 120, but on client side 140.

Still referring to FIG. 2, Dialog System Engine 120 includes one or more dialog system rules maintained in at least one rule database 260. Dialog system rules may also be associated with dialog system elements discussed below.

Dialog System Engine 120 may also include or be associated with one or more context databases 270, which maintain a plurality of context description elements such as lists of terms, keywords, phrases, expressions, context variables, and context parameters (e.g., geolocation, system rate, GUI, etc.) associated with one or more dialog system rules. In other words, context databases 270 include information supporting the process of determining conversational or environmental context for particular user requests.

Dialog System Engine 120 may also include or be associated with one or more statistics and usage databases 280, which are configured to aggregate statistical or usage information associated with the operation of Dialog System Engine 120 and/or associated Dialog System Interface 130 and/or associated mobile or software application. For example, statistics and usage database 280 may accumulate dialog system logs, which can be later used for optimization of dialog system rules, dialog system responding schemes, training machine-learning algorithms if employed by the Dialog System Engine, and so forth.

The process of creating and operating custom Dialog System Engines 120 will now be described with reference to FIG. 1 and other drawings. In particular, platform interface 112 provides one or more GUIs having a number of tools enabling developers to create and customize one or more dialog system elements, which serve as a basis for a custom Dialog System Engine.

According to various embodiments, dialog system elements include "entities" and "intents." Each entity may refer to a number of objects having the same or similar characteristics. In other words, entities are lists of terms and/or keywords defining objects of one class. In one example, an entity may refer to a keyword and a set of its synonyms. In another example, an entity may refer to a keyword and a set of its definitions. In yet another example, an entity may refer to a list (e.g., a list of cities, list of names, list of titles, list of brands, list of street names, etc.).

In some embodiments, each entity can have a title. For example, one entity can be titled as "city" and it will contain a list of cities such as Alexandria, Arlington, Boston, and so forth. In other embodiments, an entity can be titled as a keyword and it can contain synonyms and/or definitions of this keyword. In one example, the entity called "music" may include the terms of song, singer, singing, musician, and so forth. In another example, the entity called "artist" may include a list of music bands, music ensembles, or music artists. In another example, the entity called "Beatles" may include a list of possible synonyms, such as "The Beatles," "Beatles," "Fab Four," "Liverpool Legends," "John Lennon," and so forth. In yet another example, there can be an entity called "Artist" which may include various artist names, artist name synonyms, music band names, and so forth.

In some embodiments, Dialog System Engines may include a number of default, pre-configured entities and/or intents. These can include common types of entities or intents related to such concepts as time, date, location, and so forth. For example, when a developer creates a new Dialog System Engine, it may already have a few entities of common type such as "@System.Date" entity. This entity covers linguistic constructs related to particular dates and may include the following terms: "today," "tomorrow," "next week," "January 1," "January 1 of next year," "next Monday," "the following Monday," and so forth.

Further, each intent of a Dialog System Rule includes a dialog system interaction scheme, which provides a particular relation between at least one user request and at least one dialog system linguistic response or fulfillment response. The dialog system interaction scheme can be represented by a rule based on a relationship between a particular action and at least one entity. Actions generally relate to formalized software objects such as JSON (JavaScript Object Notation) objects causing at least one processor to generate linguistic or fulfillment responses associated with at least one entity. Accordingly, each intent can be represented as a logical relation between at least one action and at least one entity object, for example, as follows:

a) [Action] @ [Entity]
b) [Action] @ [Entities]
c) [Actions] @ [Entity]
d) [Actions] @ [Entities]
e) Text @ [Entity]
f) Text @ [Entities]
g) Text @ [Entity] Text
h) [Action] Text @ [Entity]

The procedures a) through d) mean that a particular Action or several Actions shall be performed by client side 140 and/or Dialog System Interface 130 with respect to a predetermined Entity or several Entities. For example, one intent may be represented as "Play @Artist," where @Artist is a developer-defined entity containing a set of artists. In this example, the intent orders the Dialog System Engine 120 to activate the playback of at least one Beatles song, depending on a context.

The procedures e) through h) mean that particular information in the form of text is provided with respect to a particular Entity. For example, the user request "Create a meeting with John at 1 p.m. tomorrow, please" may be presented as the following pattern: create a meeting @sys.any:subject @ sys.date-time. Here, @sys.any:subject refers to an entity associated with a particular name, @sys.date-time refers to an entity associated with time and date, while the phrase "Create a meeting" refers to a predetermined action to be performed by a Dialog System Interface or Dialog System Engine with a certain mobile application, software application, or web service.

As mentioned above, a dialog system rule causes generation of linguistic response and/or fulfillment response as an answer to a user request. One example of linguistic response may include particularized content deliverable as an audio message or displayable message. Fulfillment responses refer to particular processor-executable instructions for one or more software applications, middleware, firmware, web service, and the like that cause implementation of a particular action. Some examples of fulfillment responses may include scheduling an event in a calendar mobile application, writing and sending a text message or email, searching for content at a web search service, building a route in a navigational software application, and so forth. In certain embodiments, at least some linguistic responses and/or fulfillment responses can be configured by developers. In other embodiments, at least some linguistic responses and/or fulfillment responses can be pre-configured and be available as default responses.

In certain additional embodiments, developers can provide not "entities" and "intents," but just example requests to illustrate intents and entities. In these embodiments, platform 110 automatically determines, using machine-learning techniques, what "entities" and "intents" are implied in example user requests and creates corresponding rules. For example, a developer may provide example requests, such as "Play Beatles" and "I'd like to listen to Madonna," and the platform 110 will match "Beatles" and "Madonna" to existing entities (system's or user's) and generate corresponding "[Action] @ [Entity]" rules automatically.

Thus, developers can use platform interface 112 to generate a plurality of dialog system rules specific to a particular application or industry. These pluralities of entities and intents form dialog system rules (also referred to as dialog system elements) and enable custom Dialog System Engines to perform certain actions or generate certain outputs in response to a wide range of end user inputs.

Figure 3:
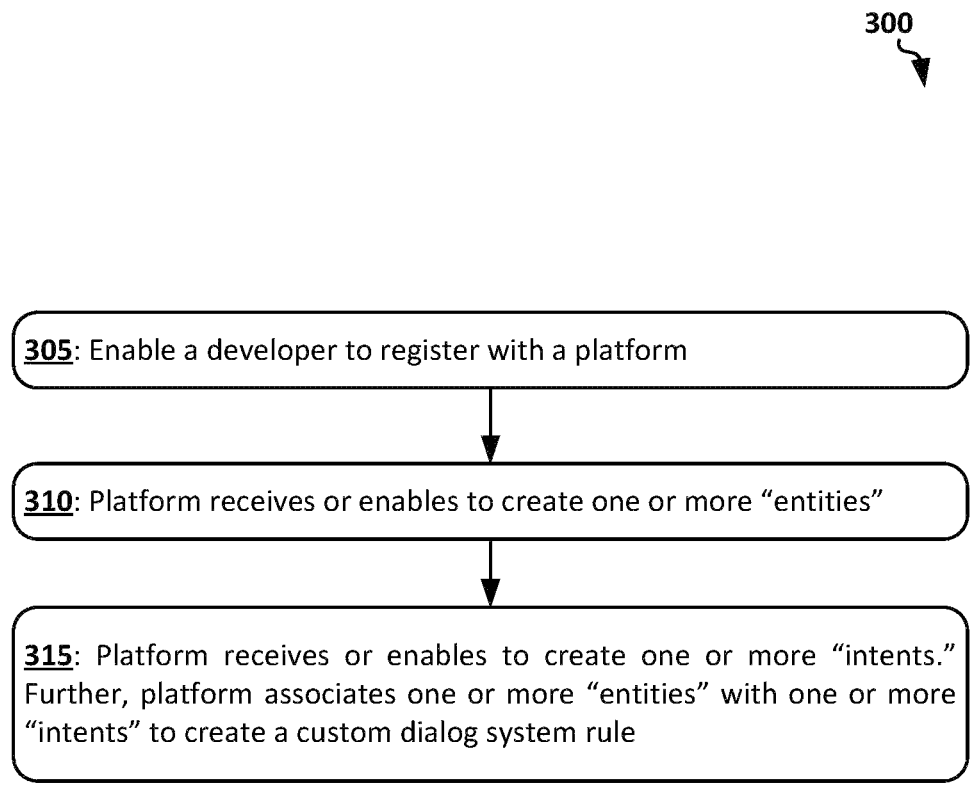
FIG. 3 is a flow chart illustrating a method for creating custom dialog system elements (rules) using a platform, in accordance with some example embodiments.

FIG. 3 is a process flow diagram showing method 300 for creating custom dialog system elements (rules) using platform 110, according to an example embodiment. The method 300 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of platform 110. Notably, below recited steps of method 300 may be implemented in an order different than described and shown in FIG. 3. Moreover, method 300 may have additional steps not shown herein, but which can be evident for those skilled in the art from the present disclosure. Method 300 may also have fewer steps than outlined below and shown in FIG. 3.

Method 300 commences at operation 305 when a developer registers with the platform 110. For these ends, the developer interacts with the platform interface 112 using a plurality of online tools or widgets. The registration may include creating a developer profile, which can be maintained by platform 110. The developer profile may virtually link (associate) a custom Dialog System Engine 120 of this developer and one or more Dialog System Interfaces 130 deployed on the client side. More specifically, a developer profile may include multiple agents (such as custom dialog system engines) and each of them could be integrated into a client application with the help of Software Development Kit (SDK). Accordingly, there can be multiple end-points for user input (Dialog System Interfaces). The communication between Dialog System Engines 120 and Dialog System Interfaces 130 may include Application Programming Interface (API) codes, rules for interaction, destination addresses, and much more.

At optional operation 310, platform 110 receives, for example, via API, from the developer, one or more entities and stores the same in one of the databases (e.g., at rule database 260). In some embodiments, the entities are not received, but created by the developer using web tools of platform interface 112. In yet other embodiments, entities are not created or received at all so long as some agents, dialog system engines, or dialog system engine rules may not have any entities.

At operation 315, platform 110 receives, for example, via API, from the developer, one or more intents and stores the same at one of databases (e.g., at rule database 260). In some embodiments, the intents are not received, but created by the developer using tools of platform interface 112. As described above, the intents, once created, are associated with the entities, and together they form dialog system elements (custom rules enabling a Dialog System Engine to generate responses tailored for specific needs). It should be noted that the developer may first create intents, and then he can create entities, which are later associated with the intents. In other words, operations 310 and 315 can replace each other.

Figure 6:
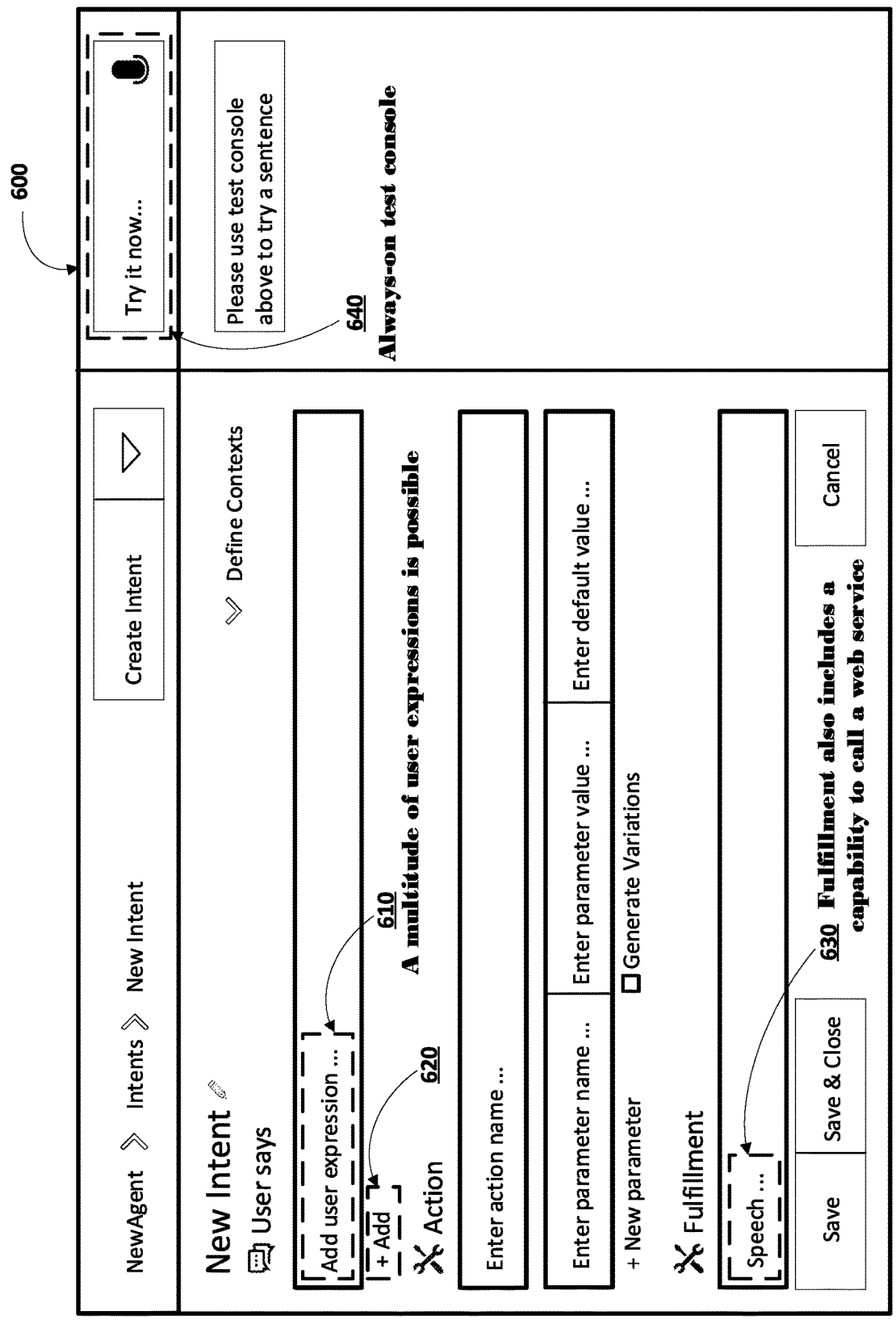
FIG. 6 shows the process of manual creating of intents for a dialog system rule, in accordance with some example embodiments.
Figure 8:
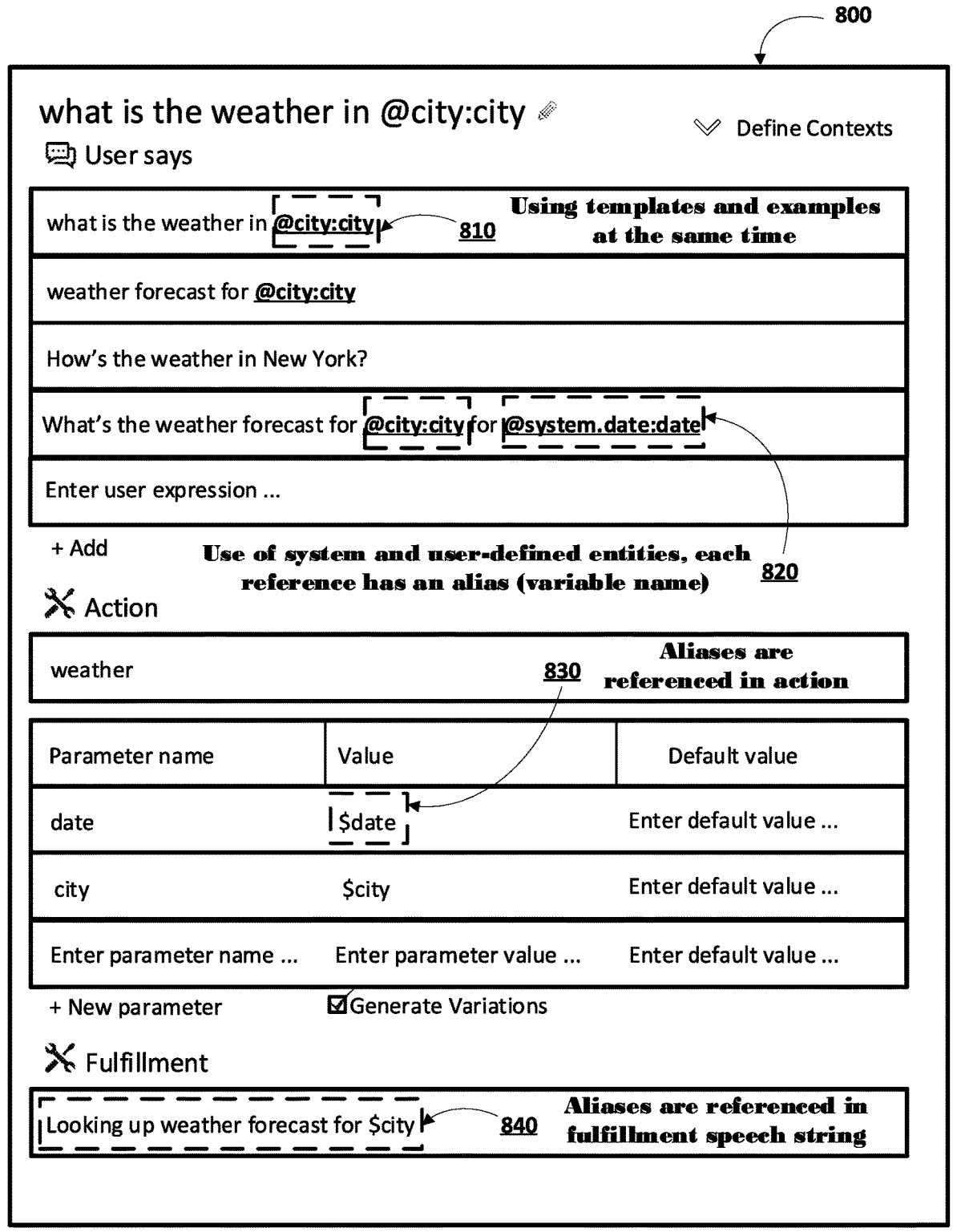
FIG. 8 shows an example rule for receiving a weather forecast, in accordance with some example embodiments.

Method 300 illustrates a set-up process for custom Dialog System Engine 120. FIGS. 6-8 illustrate various screenshots of platform interface 110 which show the process of manual creating of intents (see FIGS. 6, 8), the process of manual creating of entities (see FIG. 7), and a test console for testing dialog system elements (see FIG. 9) by developers.

Once all of the dialog system elements of Dialog System Engine 120 are created, they are maintained as a backend service and enable any of the associated Dialog System Interfaces 130 to provide the full functionality of the dialog system to users according to predetermined settings.

Figure 4:
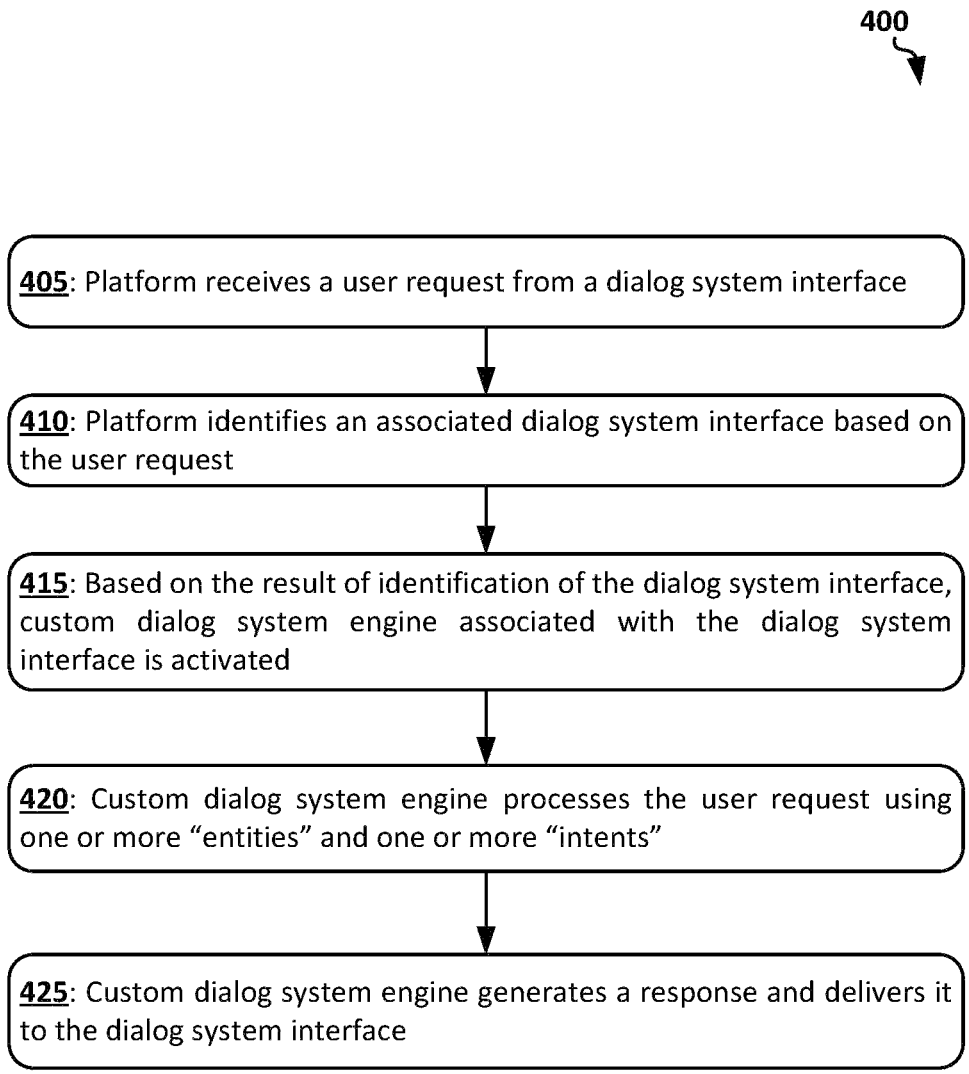
FIG. 4 is a flow chart illustrating operation process of a Dialog System Engine, in accordance with some example embodiments.

An example operation process of Dialog System Engine 120 is shown in FIG. 4. Method 400 of FIG. 4 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the platform 110. Notably, the below recited steps of method 400 may be implemented in an order different than described and shown in FIG. 4. Moreover, the method 400 may have additional steps not shown herein, but which can be evident for those skilled in the art from the present disclosure. The method 400 may also have fewer steps than outlined below and shown in FIG. 4.

At operation 405, platform 110 receives a user request from an unidentified Dialog System Interface 130. The user request can be a voice input or text input. In some embodiments, Dialog System Interface 130 can pre-process the user input, for example, by recognizing spoken words and transforming the voice input into text input. In other embodiments, however, no pre-processing is performed by Dialog System Interface 130.

At operation 410, platform 110 processes the user request and identifies Dialog System Interface 130. For these ends, the user request can be accompanied by an identifier (ID) at the time the user request is sent from Dialog System Interface 130 to platform 110. Generally, identifiers here may refer to (a) a user ID, which can be used to retrieve developer's or end-user profile; (b) a session ID, which can be used to retrieve current dialog context between the given end user and the Dialog System Engine; and (c) a set of keys/agents (i.e., custom dialog system IDs), which can be used to identify entities, intents, and other data associated with the user request.

At operation 415, based on the result of the identification at operation 410, the platform 110 activates the custom Dialog System Engine 120 associated with the identified Dialog System Interface 130. At the same operation, platform 110 may also retrieve or identify one or more dialog system elements (i.e., one or more entities and one or more intents) based on the result of the identification at operation 410. Additionally in some embodiments, the dialog system elements can be retrieved based on contextual data used in training a machine learning classifier.

At operation 420, Dialog System Engine 120 processes the user request using identified dialog system elements (i.e., one or more entities and one or more intents) as retrieved at operation 410. Some examples of dialog system processing are further described with reference to FIG. 4.

At operation 425, Dialog System Engine 120 generates a response and sends it to Dialog System Interface 130 associated with Dialog System Engine 120. The response may include text, audio, image, and/or video message, Uniform Resource Locator (URL), callback URL, metadata, computer-readable instructions, and so forth. Dialog System Interface 130 then displays and/or playbacks the response to the end user depending on predetermined settings.

Additional details related to the operation of platform 110 and creating custom Dialog System Engines are provided in co-pending U.S. provisional patent application Ser. No. 62/050,149, titled "Platform for Creating Customizable Dialog System Engines," filed on Oct. 21, 2014, which is incorporated herein in its entirety.

As outlined above, some user requests cannot be processed at all or can be inaccurately processed by conventional Dialog System Engines out of context. To process such requests, a context-based approach may be applied.

Figure 5:
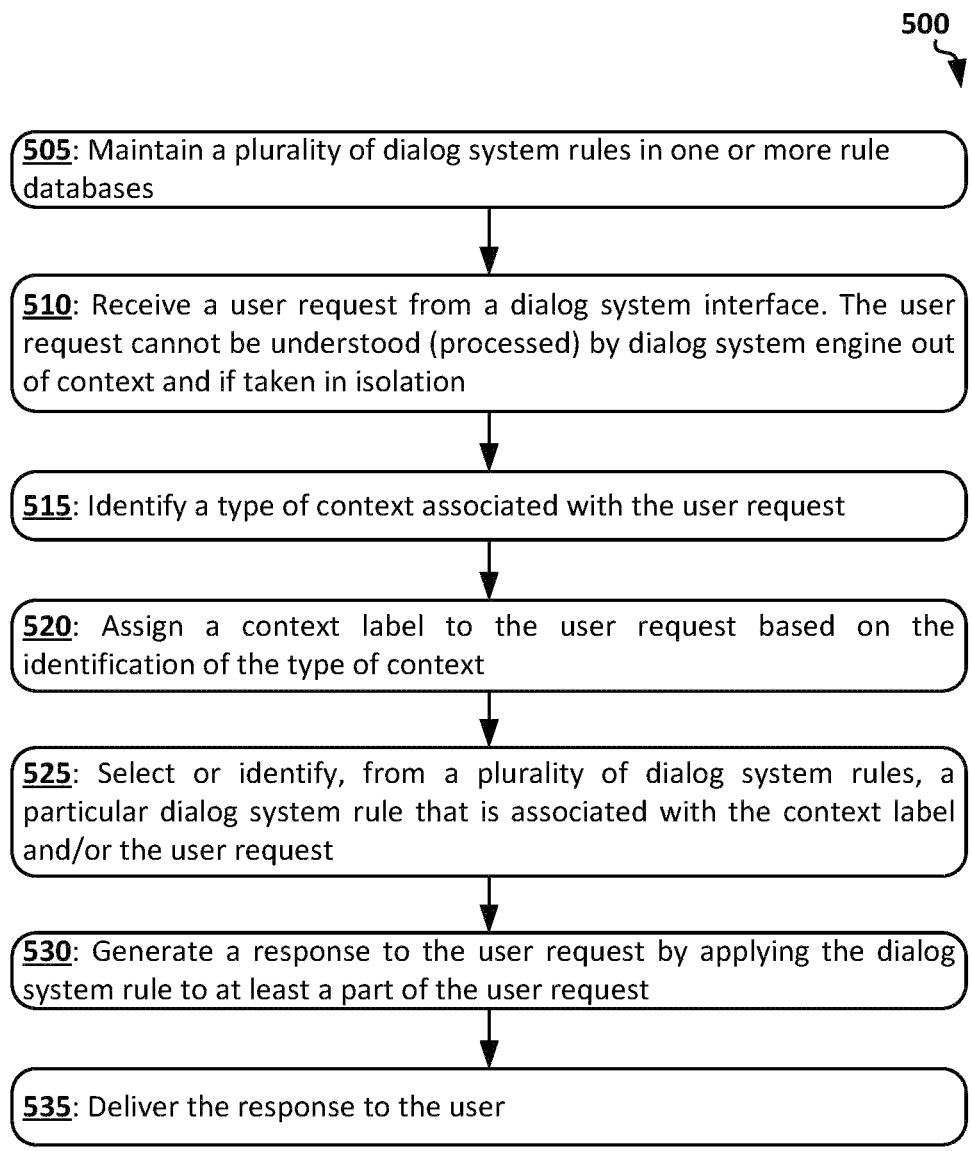
FIG. 5 shows a process flow diagram for a method of context-based NLP according to an example embodiment.

FIG. 5 shows a process flow diagram for method 500 of context-based NLP, according to an example embodiment. The method 500 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of platform 110. Notably, the below recited steps of method 500 may be implemented in an order different than described and shown in FIG. 5. Moreover, method 500 may have additional steps not shown herein, but which can be evident for those skilled in the art from the present disclosure. Method 500 may also have fewer steps than outlined below and shown in FIG. 5.

At operation 505, Dialog System Engine 120 maintains a plurality of dialog system rules in one or more rule databases 260. As discussed above, each dialog system rule includes at least one "intent." Dialog system rules can be created by developers or automatically by Dialog System Engine 120 utilizing machine-learning algorithms, statistical approaches, heuristic approaches, and so forth.

At operation 510, Dialog System Engine 120 receives a user request from Dialog System Interface 130. The user request can optionally be pre-processed by transformation into a text. Moreover, the user request may have additional attributes such as current geographical location, currently used software application, type of device used (e.g., mobile phone, laptop computer, in-vehicle computer, and so forth), and contextual information, among others. In some embodiment, contextual information can be used for pre-filtering user intents. Dialog System Engine 120 may optionally determine that the user request cannot be understood by Dialog System Engine 120 out of context and if taken in isolation. Some examples of non-understandable user requests may include "Schedule a meeting tomorrow," "Cancel," "What about LA," and the like.

At operation 515, Dialog System Engine 120 identifies a type of context associated with the user request. The identification can be based on the user request, a dialog system rule related to the user request, user request attributes, an environmental condition (e.g., weather at the location of the user), or any combination thereof.

At operation 520, Dialog System Engine 120 assigns a context label to the user request based on the result of identification performed at operation 515. Some examples of context labels may include, among others, "Schedule Meeting" context, "Weather" context, "Navigation" context, "Create Email" context, and "Moves search" context.

At operation 525, Dialog System Engine 120 selects or identifies, from a plurality of dialog system rules, such as intents, a particular dialog system rule (intent) that is associated with the context label and/or user request. In some embodiments, the context label can be set to a Boolean expression such as "isSet(contextLabel)." In some embodiments, Dialog System Engine 120 can check on a predicate $P_{contexts}$ which can implement arbitrary logic on contexts and context variables. Output contexts can be set when intents are matched. In some embodiments, selection of a particular dialog system rule can be carried out based on output of a classifier, presence of contexts, context age and lifespan, and presence of additional variables associated with the contexts. The output of the classifier may include confidence scores or rankings for dialog system rules At operation 530, Dialog System Engine 120 generates a response to the user request by applying the dialog system rule to at least a part of the user request.

Finally, at operation 535, Dialog System Engine 120 delivers the response to the user. The delivery can be direct or through Dialog System Interface 130.

The present technology allows accurately processing all possible user requests, including those requests that, if taken in isolation from others, have no reasonable understanding. For these ends, the Dialog System Engines can track user requests, dialog system responses, user activities, user location, currently running software or mobile applications, date and time, and other factors in order to identify a particular context for a certain user request. Contexts may refer to conversational contexts and environmental contexts depending on user actions and requests. Conversational contexts means a particular dialog between the user and Dialog System, while environmental context means a particular condition, circumstances, or operation of user, user device or software application. Both conversational context examples and environmental context examples will now be described.

Assume there is a conversation consisting of two users requests between the user and the Dialog system. The first user request is "What is the weather like in New York?" and second user request is "What about Los Angeles?"

When Dialog System Engine 120 acquires the first user request "What is the weather like in New York?" dialog system rule [Weather] @ [City] may be identified and applied against the user request by Dialog System Engine 120 to generate a proper response. In this example, the phrase "what is the weather like" refers to "intent" and "New York" refers to a particular value of the "intent." Accordingly, when Dialog System Engine 120 determines "what is the weather like" intent, Dialog System Engine 120 activates a particular action of acquiring temperature data from a predetermined web service with respect to the value "New York." Temperature data is then used to generate a response and deliver the same to the user in a predetermined format. At this step, Dialog System Engine 120 may also label the current user session, for example, with a "weather" context label.

When the user makes the subsequent inquiry "What about Los Angeles?," a conventional Dialog System Engine may not accurately process this request because it is a non-understandable one, when taken in isolation and out of context. A Dialog System Engine will likely recognize the entity "Los Angeles" but would not be able to identify any intent with respect to "What about" if this inquiry was taken in isolation from others.

In this technology, however, when a non-understandable, out of context request is received by Dialog System Engine 120, it may determine that the part of the second user request "What about" is not understandable out of context and then proceed in identifying the current user session. For these ends, Dialog System Engine 120 determines that the current user session has the "weather" context label. Accordingly, Dialog System Engine 120 refers to a particular context database 270 or its portion, which includes intents associated specifically with the "weather" context.

Generally, context database 270 may store context-defining terms, keywords, phrases, variables, and/or expressions associated with certain context labels. Context labels may also be associated with particular dialog system rules and/or dialog system elements.

In the example discussed above, context database 270 may store a plurality of expressions, such as "what about," "and how is it in," "and the same in," "what is the temperature like in," and the like, all associated with the particular intent. Thus, once Dialog System Engine 120 identifies the "weather" context, Dialog System Engine 120 can associate the non-understandable portion of the second user request "what about" with the intent [Weather]. Dialog System Engine 120 then identifies which dialog system rule shall be applied (i.e., [Weather] @ [City] in this case) to process the user request.

Thus, a significant aspect of the conversational context approach is that the looking up non-understandable terms or expressions in context database 270 is based on a context label assigned to the conversation based on previously applied dialog system rules. Notably, in some embodiments, in order to assign a context label, Dialog System Engine 120 may need to not only identify the last dialog system rule applied, but a number of previously used dialog system rules. For example, a first user request could refer to "What is the weather like in New York?" The second user request may refer to "Do I have new emails?" Lastly, the third user request could be "And what it is like in Los Angeles today?" In this example scenario, Dialog System Engine 120 can first search for a context for the third user request in context database 270 among terms associated with the dialog system rule applied to the second user request, and if the results of this search are negative, the Dialog System Engine 120 may start searching the context for the third user request in context database 270 among terms associated with the dialog system rule applied to the first user request.

In some embodiments, each intent may be associated with two sets of contexts including input contexts and output contexts. In particular, input contexts include pre-conditions for intents being executed or matched. Output contexts refer to contexts that are set into user dialog sessions. Note that input contexts may use different logic for the pre-requisite checking. For example, all contexts can be set using logical operation AND, or any of the specified contexts can be set using logical operation OR between all contexts in input context set. Additionally, certain contexts may have an arbitrary Boolean expression. In some embodiments, the Dialog System can do checks not only on the presence of specific contexts in input context sets, but also on values of variables within particular contexts.

In some embodiments, dialogs between the user and the Dialog System can be assigned with more than one context label. For example, each processed user request may be associated with a context label and each subsequent user request may be processed using a plurality of context labels. In yet more embodiments, multiple context labels may be aggregated in a "global" user context. For example, if there are identified more than a predetermined number (e.g., three) of the same context labels with respect to past user requests, the dialog between the user and the Dialog System may be labeled with a new global context label which shall have higher priority over other context labels.

In certain embodiments, Dialog System Engine 120 may have predetermined settings to search one portion of the context database after another until a predetermined number of database portions are searched. In other embodiments, Dialog System Engine 120 may monitor a time period lapsed since a previous context label was assigned to a particular user request. If the previous context label was assigned more than a predetermined period since a new user request, Dialog System Engine 120 is not instructed to search the context database associated with this previous context label. In other words, context labels may be configured to "expire" after expiration of a predetermined period since such a context label was assigned to a dialog. One may also refer to this property of context labels as a length of context life in a user session. The length here may refer to a time period or a number of user requests. In some embodiments, developers can define context lengths, when describing intents. Developers can also force expiration of certain contexts (e.g., when an end-user says "Cancel," then all contexts could be cleared).

FIG. 6 shows the process 600 of manual creating of intents for a dialog system rule. Intents can be provided as multiple sets of linguistic elements such as words or phrases associated with particular actions. Some examples of intents associated with the action of playing multimedia content may include "Play," "Start playback," "Activate playing," "Open," and so forth. Additionally, the context database 270 may also store multiple context words or phrases, such as "what about," "and how is it in," "and the same in," "and what about," and so forth, all associated with a particular dialog system rule. These context phrases can facilitate interpretation of user inputs. In some embodiments, the context database 270 may also store pre-built lexical data including, but not limited to, synonyms (words, phrases). In yet more embodiments, the context database 270 may also include pre-built knowledge databases such as WordNet or the like.

FIG. 6 illustrates an intent including a multitude of user expressions 610 identified automatically from exemplary phrases or specified by a developer, for example, by adding a new user expression using an Add control 620. On fulfillment 630 of the rule associated with the intent, the system may provide a speech string of call a web service. Additionally, a developer can test the rule execution using an always-on test console 640 by entering a test phrase.

FIG. 7 shows the process 700 of manual creating of entities via the platform interface 112. In one example, one set of entities may include definitions of geographical locations including city names such as "Atlanta," "Belfast," "Boston," "Chicago," "Detroit," and so forth. In another example, another set of entities may include time definitions such as "today," "tomorrow," "next week," "next Monday," "October 1," and the like. It shall be clear that the context database 270 may include multiple sets of entities with each related to various activities.

As illustrated, the entity related to city may be associated with multiple values (for example, New York, Washington, Paris, and so forth). Each of the values may include a list of synonyms 710 and a singular reference value/canonical value 720. A developer can manage (add, edit, delete) the values of an entity and the list of synonyms 710 for each value.

FIG. 8 shows an example rule 800 for receiving a weather forecast. As illustrated, the rule 800 includes multiple user expressions 810 that can be used by the user to request a weather forecast (for example, "what is the weather in," "weather forecast for," and so forth). Entities, such as city or date, in user expressions can be provided using an alias 820 (or placeholder). Aliases can be referenced in action 830 and in fulfillment 840 sections. A developer can manage user expressions 810, actions, and fulfillment parameters.

New dialog system rules including intents and entities are stored in the rule database 260. One way to create new dialog system rules is a manual input of intents and entities, including specification of references to entities within intents. However, this approach may not be effective in certain instances and may have some disadvantages. For example, it can be very time consuming for developers to specify various natural language inputs to cover the wide range of inputs in which a certain user request can be made. The present technology addresses this problem by having platform 110 automatically create dialog system rules in response to receiving exemplary user requests from developers and/or analyzing requests from multiple dialog system users. Embodiments of this disclosure provide for context database 270 to be automatically populated with certain additional terms, keywords, phrases, and/or expressions using machine-learning and/or pattern recognition techniques when developers input exemplary user requests that potentially can be used by end users in the course of interaction with the Dialog System.

For example, developers may provide exemplary phrases such as "What is the weather like in New York," "What is the current temperature in Las Vegas," "What is the forecast for Washington D.C.," "How it is in Moscow," "Do I need my umbrella tomorrow," and so forth. These and other exemplary phrases can be provided via platform interface 112 and/or during the interaction of a developer or end user with Dialog System Engines 120.

Figure 9:
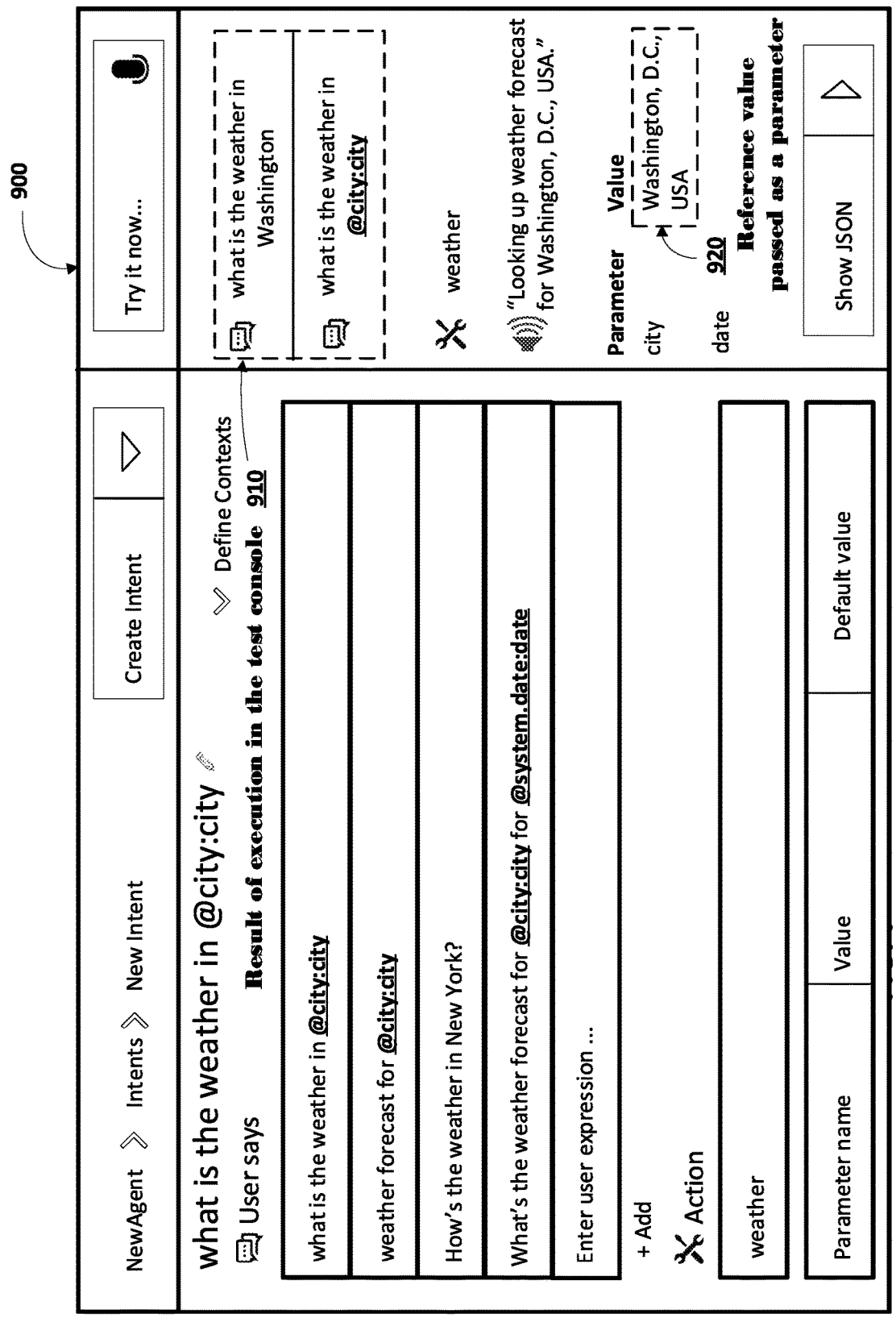
FIG. 9 shows a process of testing dialog system elements by developers, in accordance with some example embodiments.

FIG. 9 shows a process 900 of testing dialog system elements by developers. To test a rule, a developer can enter a test phrase in the test console. The test phrase may be processed 910 by the system to identify entities and intents in the test phrase. The result of the processing can be provided to the developer for review. Based on the processing, action associated with the intent may be provided as a response to the test phrase with reference values of the entities passed as a parameter 920. The developer can modify the intent according to the test results.

Once all dialog system elements of the Dialog System Engine 120 are created, they can be maintained as a backend service and enable any of the associated dialog system interfaces 130 to provide the full functionality of the dialog system to users according to predetermined settings.

Figure 10:
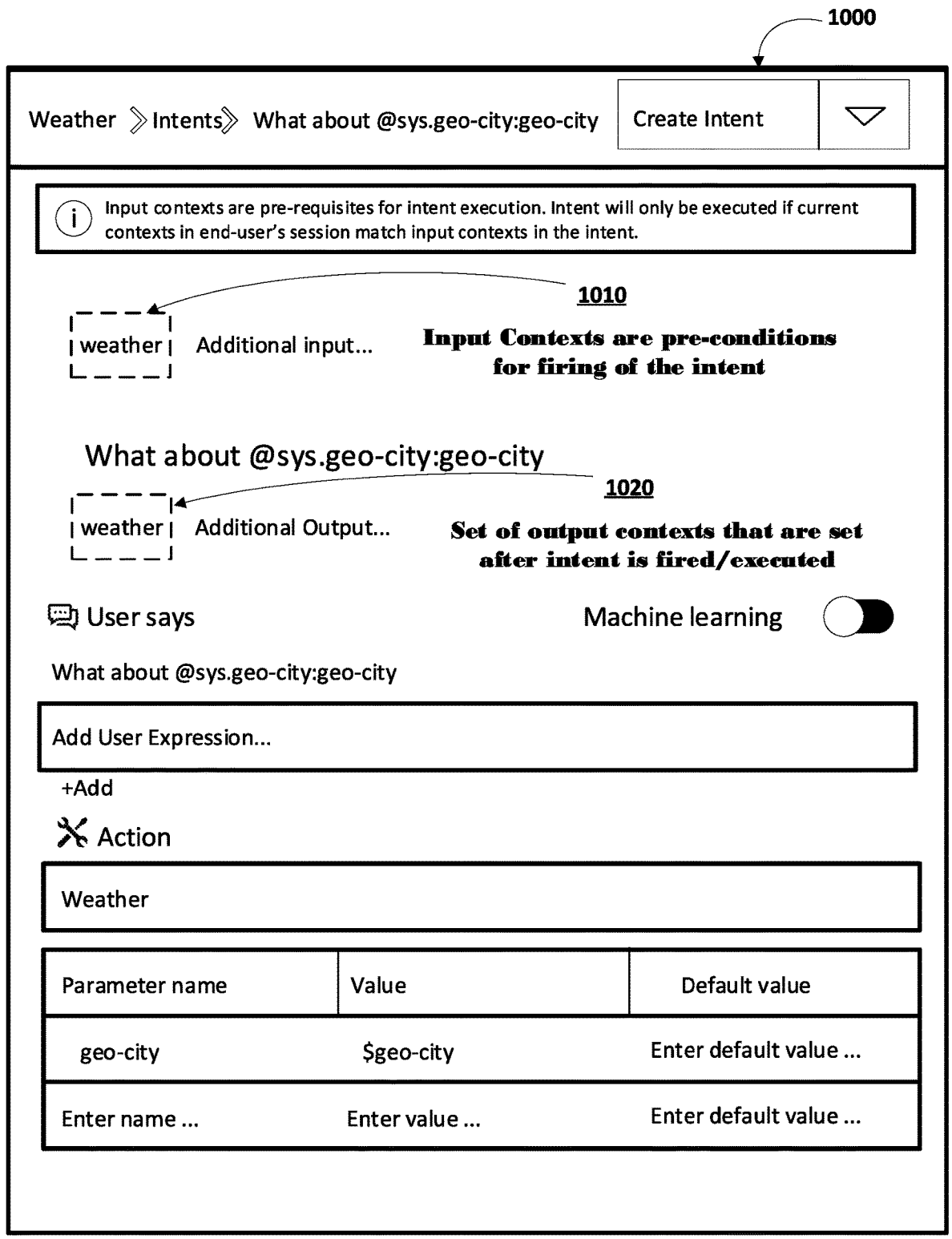
FIG. 10 shows a process for configuring contexts associated with a dialog system rule, in accordance with certain example embodiments.

FIG. 10 shows a process 1000 for configuring contexts associated with a dialog system rule, in accordance with certain example embodiments. An input context list 1010 can be modified to add or delete contexts that can be pre-conditions for activating an intent. Additionally, developers can manage output context list 1020 that includes the contexts activated after the intent is executed.

The present technology allows developers to establish context defining terms, keywords, phrases, variables, and expressions and store them in context database 270 and associate them with one or more dialog system rules. In yet more embodiments, context database 270 can be also automatically populated with certain additional terms, keywords, phrases, variables, and/or expressions using machine-learning techniques in the course of interaction with user requests.

In some embodiments, context labels are assigned based on specific conditions, circumstances, physical environment surrounding the user, location or motion of the user, movement direction, type or make of user device used, software or mobile applications currently used, data contained on user device, time, date, weather, scheduled user events or errands, physical or health condition of the user, and so forth. These approaches involve multimodal cooperation of the Dialog System with a user device. In various embodiments, context labels can be submitted to the Dialog System via one or more APIs. The submission of the context labels can be performed with the same query as text and voice data or in a separate request.

In one example, when a user activates a particular software or mobile application, such as a browser, Dialog System Interface 130 or Dialog System Engine 120 identifies this action and assigns a corresponding context label such as a "Browser" context label. The length of life of this context label may be dynamic and be equal to the period when the browser application is active on the user device. If the user makes an inquiry to the Dialog System such as by making a verbal request "Next," this search request may not be understood by Dialog System Engine 120 without context and if taken in isolation. In this technology, Dialog System Engine 120 retrieves or identifies a current context label and addresses to particular dialog system rules that are associated with intents and entities linked to the current context label. In this example, Dialog System Engine 120 identifies the current "Browser" context label and finds in context database 270 intents and entities, as well as context-defining terms, keywords, phrases, variables, and/or expressions associated specifically with the Browser application currently running on the user device. For example, intents may include such terms as "Next," "Previous," "Cancel," "Open," "Input," "Download," and so forth. Accordingly, once the Dialog System Engine 120 properly processes the user request "Next" based on the "Browser" context label, Dialog System Engine 120 generates a response that is delivered to the user device. The response may refer to a computer-implementable instruction, such as a callback URL, executable code, or actionable command, which instructs the currently running browser to open a next webpage to fulfil the user request. Similarly, when the user switches to another software application, the context label may be also replaced with a new one. For example, if the user switches to a navigational mobile application after using the browser, the Dialog System Interface 130 or Dialog System Engine 120 may assign a new context label, e.g., a "Navigation" context label, so as to accurately address further user requests.

In another example, assigning context labels may be associated with Dialog System Engine 120 performing additional steps before a response can be provided to the user. Additional steps may refer to acquiring additional data or information from a user device, web resources or web services 160, databases 260-280, and so forth. In an example embodiment, the user makes an inquiry to the Dialog System such as "Email John I'm going to be late." When Dialog System Engine 120 processes such request, Dialog System Engine 120 generally applies the following dialog system rule [Create Email] @[Entity] [Text]. While all elements of this user request can be generally understandable, one portion of the request may not be properly or accurately addressed by Dialog System. Namely, the entity "John" may be non-understandable out of context.

Dialog System Engine 120 may assign "Email" context label based at least on the user request or other parameters such as the currently running mobile application. Under the "Email" context label, Dialog System Engine 120 acquires records of the user device to find any contacts having the name "John." If there are several Johns, a response of Dialog System Engine 120 may include a clarification request to the user asking him to select a particular John among all Johns he has stored in his contact list. When a particular contact is clarified, Dialog System Engine 120 generates a response, which constitutes a computer-executable instruction to run an email agent and generate an email message with a predetermined text.

In yet more examples, context labels may be associated with particular variables that assist Dialog System Engine 120 in generating proper responses. This approach is described below with respect to a conversational dialog between the user and the Dialog System related to scheduling an event in a calendar mobile application. First, the user makes an inquiry "Schedule a meeting" to the Dialog System. As described above, Dialog System Engine 120 may accurately identify a particular dialog system rule including an intent "Meeting." Here, Dialog System Engine 120 further assigns a "Meeting" context label to this first user request. The lifetime parameter can be set, for example, to 1 minute or 5 user requests or any other similar default value. In some embodiments, the lifetime parameter can be dynamically varied depending on circumstances. In yet more embodiments, the lifetime parameter can be adjusted or manually configured by the developer.

Dialog System Engine 120 generates a first response in the form of a clarifying question such as "When should the meeting take place?" based on the identified dialog system rule. Accordingly, the user may provide a second user request such as "1 p.m. tomorrow." At this step, Dialog System Engine 120 further assigns a "start" variable to the "Meeting" context label, and sets "start" variable to "1 p.m. tomorrow." Dialog System Engine 120 also generates a second response to the user in the form of an additional clarifying question such as "How long should the meeting be?" based on the identified dialog system rule. Next, the user provides a third user request in the form of an answer to the last question. For example, the answer may be "One hour." Similar to above, at this step, Dialog System Engine 120 assigns a "duration" variable to "Meeting" context label, and sets the "duration" variable to one hour. Dialog System Engine 120 generates a third response to the user in the form of yet another additional clarifying question such as "Okay, meeting tomorrow at 1 p.m. for one hour, is this correct?" based on the identified dialog system rule. In response, the user provides a fourth user request in the form of an answer such as "Yes." Finally, when this response is received by Dialog System Engine 120, Dialog System Engine 120 generates a fourth response in the form of a computer-executable instruction to generate an event in a calendar application based on the dialog system rule, as well as the "start" and "duration" variables. The calendar application may refer to a web service and/or software (mobile) application. The computer-executable instruction may be delivered right to the web service or software application, or, alternatively, to Dialog System Interface 130 for further processing. In some embodiments, while generating responses, the Dialog System Engine 120 may also set contexts for a given session. For example, context information can be returned along with the text response.

Figure 11:
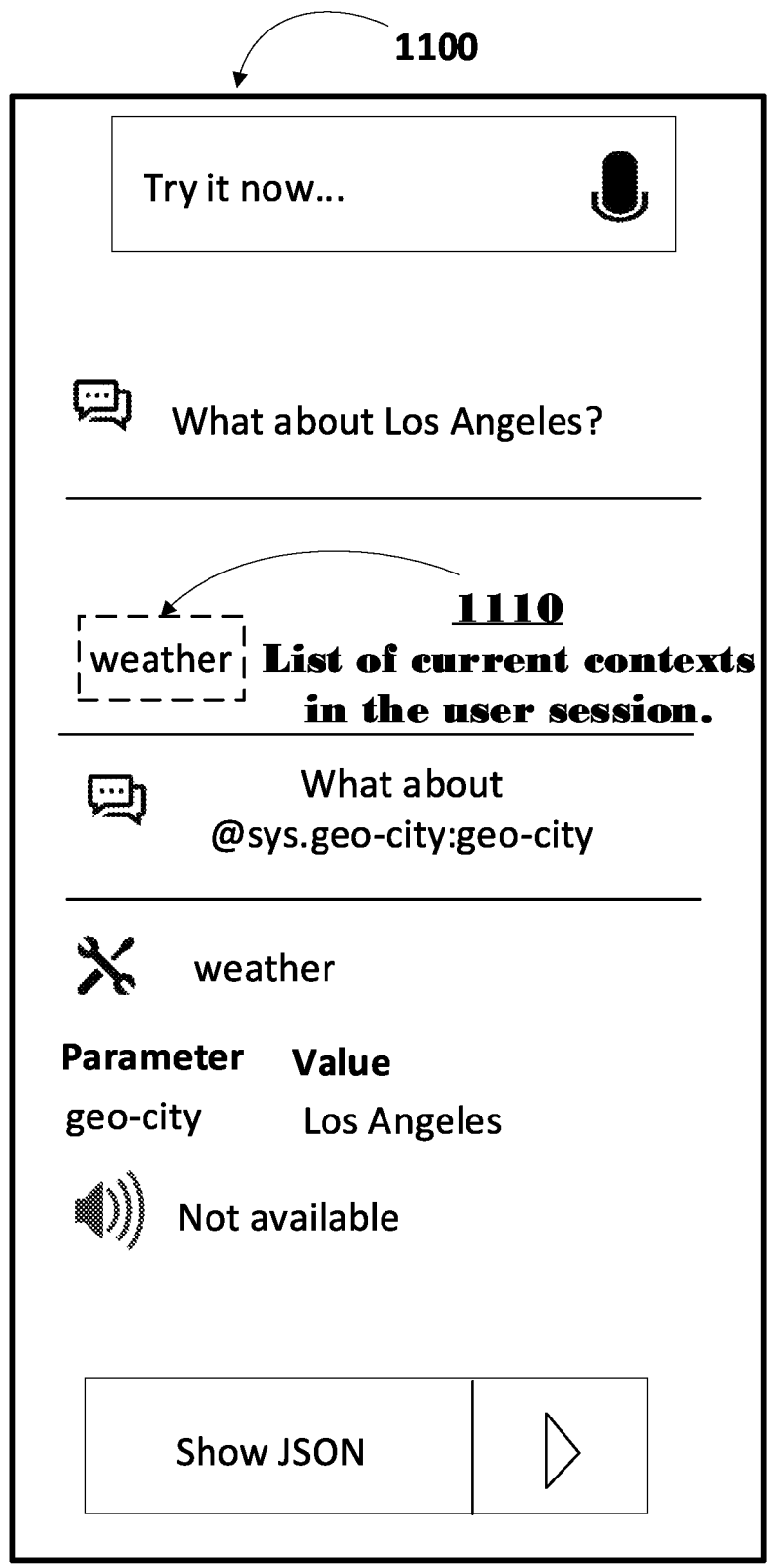
FIG. 11 shows a process for testing contexts, in accordance with certain example embodiments.

FIG. 11 shows a process 1100 for testing contexts, in accordance with certain example embodiments. A list of current contexts 1110 shows the contexts assigned to a user session.

Figure 12:
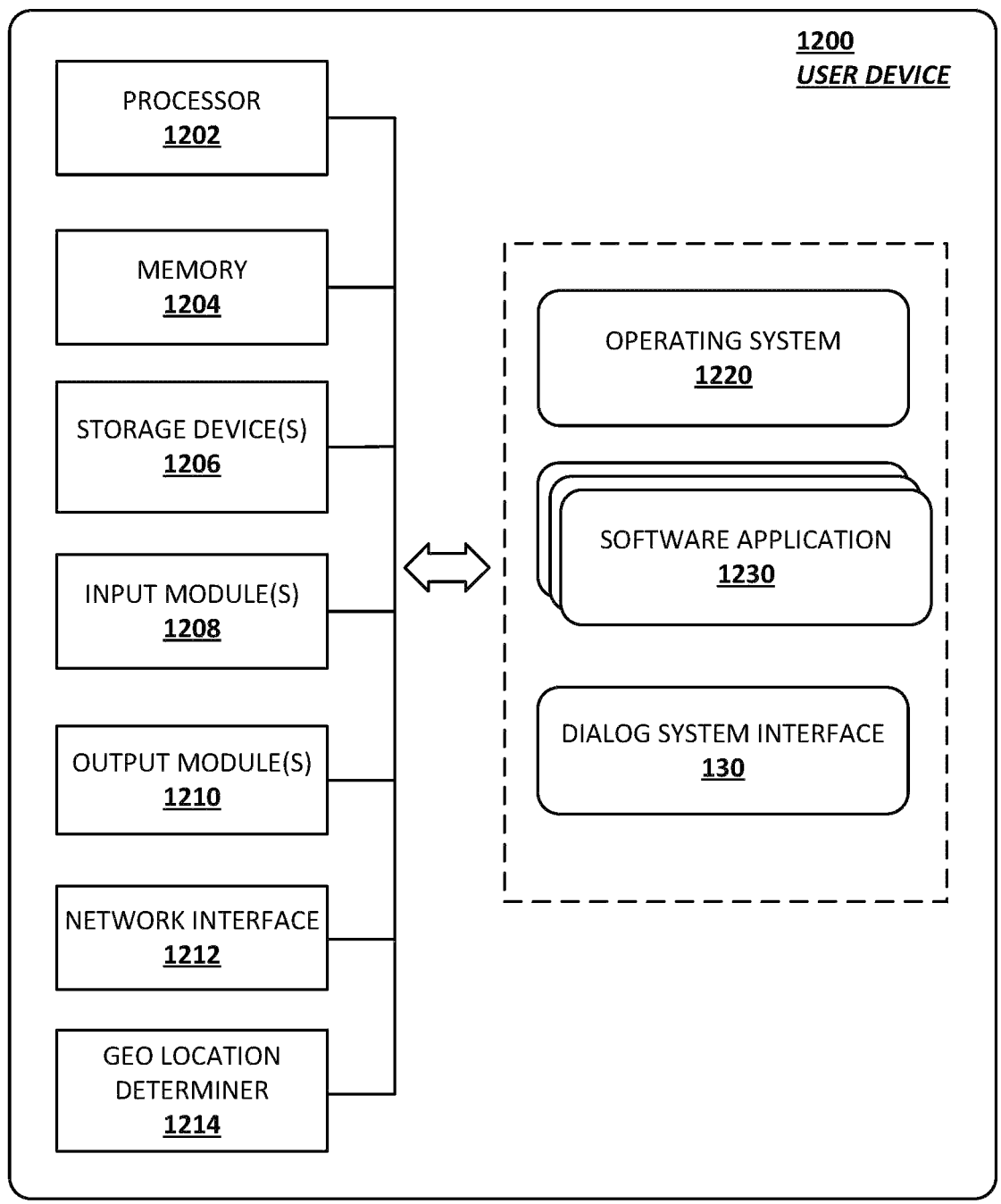
FIG. 12 is a high-level block diagram illustrating an example user device suitable for implementing the methods described herein.

FIG. 12 is a high-level block diagram illustrating an example user device 1200 suitable for implementing the methods described herein. It is worth mentioning that all components of the user device may include logic elements, hardware components, software (firmware) components, virtual components, or a combination thereof.

The user device 1200 includes at least an integral part of one or more of a variety of types of devices and systems such as a general-purpose computer, desktop computer, server, computer network, network service, cloud-computing service, and so forth. Further, all modules shown in FIG. 12 may be operatively coupled using any suitable wired, wireless, radio, electrical, or optical standards. As already outlined above, user device 1200 may refer to a smart phone, wireless telephone, computer, such as a tablet computer or desktop computer, infotainment system, in-vehicle computing device, and the like.

As shown in FIG. 12, the user device 1200 includes the following hardware components: one or more processors 1202, memory 1204, one or more storage devices 1206, one or more input modules 1208, one or more output modules 1210, network interface 1212, and optional geo location determiner 1214. User device 1200 also includes the following software or virtual components: an operating system 1220, one or more software (mobile) applications 1230, and Dialog System Interface 130, which can be a stand-alone software application or be integrated into one or more software applications 1230. Dialog System Interface 130 provides a human-centric interface for accessing and managing information as discussed herein, communicating with Dialog System Engine 120, and communicating with web resources or web services 160.

Processors 1202 are configured to implement functionality and/or process instructions for execution within user device 1200. For example, the processor(s) 1202 may process instructions stored in memory 1204 and/or instructions stored on storage devices 1206. Such instructions may include components of an operating system 1220 and Dialog System Interface 130. The user device 1200 may also include one or more additional components not shown in FIG. 12, such as a housing, power supply, communication bus, and the like. These elements are omitted so as to not burden the description of present embodiments.

Memory 1204, according to one example embodiment, is configured to store information within the user device 1200 during operation. Memory 1204 may refer to a non-transitory computer-readable storage medium or a computer-readable storage device. In some examples, memory 1204 is a temporary memory, meaning that a primary purpose of memory 1204 may not be long-term storage. Memory 1204 may also refer to a volatile memory, meaning that memory 1204 does not maintain stored contents when memory 1204 is not receiving power. Examples of volatile memories include random access memories (RAM), dynamic random access memories (DRAM), static random access memories (SRAM), and other forms of volatile memories known in the art. In some examples, memory 1204 is used to store program instructions for execution by the processors 1202. Memory 1204, in one example embodiment, is used by software (e.g., the operating system 1220) or Dialog System Interface 130 executing on user device 1200 to temporarily store information during program execution. One or more storage devices 1206 can also include one or more transitory or non-transitory computer-readable storage media and/or computer-readable storage devices. In some embodiments, storage devices 1206 may be configured to store greater amounts of information than memory 1204. Storage devices 1206 may further be configured for long-term storage of information. In some examples, storage devices 1206 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing FIG. 12, user device 1200 includes one or more input modules 1208. The input modules 1208 are configured to receive user inputs. Examples of input modules 1208 include a microphone, keyboard, keypad, mouse, trackball, touchscreen, touchpad, or any other device capable of detecting an input from a user or other source in the form of speech, audio, or tactile actions, and relaying the input to the user device 1200 or components thereof.

Output modules 1210, in some example embodiments, are configured to provide output to users through visual or auditory channels. Output modules 1210 may include a video graphics adapter card, liquid crystal display monitor, light emitting diode monitor, sound card, speaker, or any other device capable of generating output that may be intelligible to a user.

User device 1200, in some embodiments, includes network interface 1212. Network interface 1212 can be utilized to communicate with external devices, servers, and networked systems via one or more communications networks such as one or more wired, wireless, or optical networks including, for example, the Internet, intranet, LAN, WAN, cellular phone networks (e.g. Global System for Mobile (GSM) communications network, packet switching communications network, circuit switching communications network), Bluetooth radio, and an IEEE 802.11-based radio frequency network, among others. Network interface 1212 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as Universal Serial Bus (USB).

User device 1200 may further include optional geo location determiner 1214 for determining a current geographical location of the user device. Geo location determiner 1214 may utilize a number of different methods for determining geographical location including, for example, receiving and processing signals of Global Positioning Systems, GLONASS satellite navigation systems, or the Galileo satellite navigation system; utilizing multilateration of radio signals between radio towers (base stations); or utilizing geolocation methods associated with Internet Protocol (IP) addresses, Media Access Control addresses, Radio-Frequency Identification, or other technologies.

Operating system 1220 may control one or more functionalities of user device 1200 or components thereof. For example, operating system 1220 may interact with Dialog System Interface 130 and may further facilitate one or more interactions between applications 1230 and one or more of processors 1202, memory 1204, storage devices 1206, input modules 1208, and output modules 1210. As shown in FIG. 12, operating system 1220 may interact with or be otherwise coupled to Dialog System Interface 130 and components thereof. In some embodiments, Dialog System Interface 130 can be included in the operating system 1220. Notably, user device 1200 and its components such as the Dialog System Interface 130, may also interact with one or more remote storage or computing resources including, for example, web resources, web sites, social networking websites, blogging websites, news feeds, email servers, web calendars, event databases, ticket aggregators, map databases, points of interest databases, and so forth.

Figure 13:
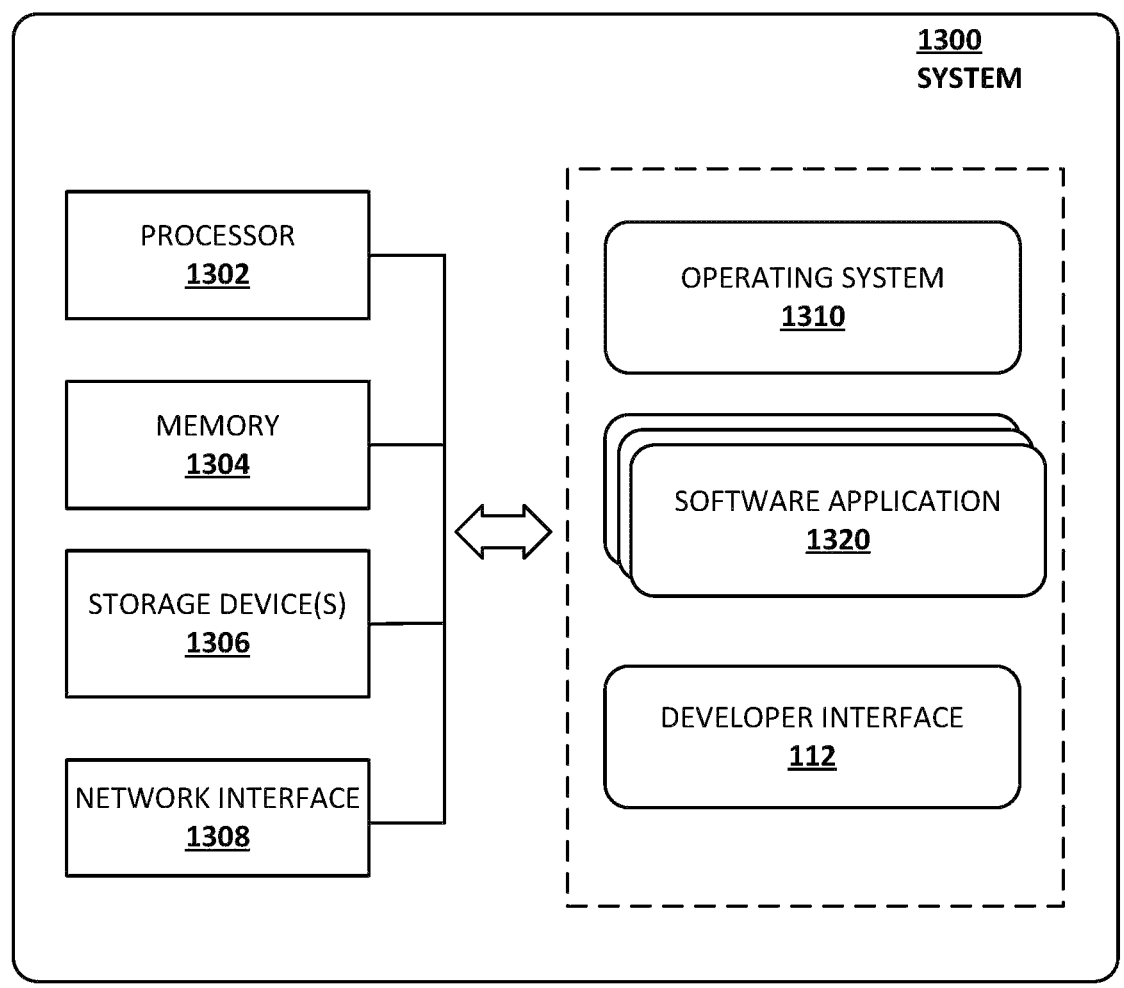
FIG. 13 is a high-level block diagram illustrating an example system suitable for implementing the methods described herein.

FIG. 13 is a high-level block diagram illustrating an example system 1300 suitable for implementing the methods described herein. In particular, system 1300 is a server-based solution suitable for running platform 110.

Note that all components of system 1300 include logic elements, hardware components, software (firmware) components, virtual components, or a combination thereof. System 1300 may include, relate, or constitute an integral part of one or more of a variety of types of devices and systems such as a general-purpose computer, server, web server, network service, cloud-computing service, and so forth. Further, all modules shown in FIG. 13 may be operatively coupled using any suitable wired, wireless, radio, electrical, or optical standards.

As shown in FIG. 13, system 1300 includes the following hardware components: one or more processors 1302, memory 1304, one or more storage devices 1306, and network interface 1308. System 1300 also includes the following software or virtual components: operating system 1310, one or more software applications 1320, and platform interface 112. The platform interface 112 may provide a human-centric interface for accessing and managing information by developers, namely, for creating and managing Dialog System Engines 120.

In some embodiments, processor 1302 is configured to implement functionality and/or process instructions for execution within system 1300. For example, processor 1302 may process instructions stored in memory 1304 and/or instructions stored on storage devices 1306. Such instructions may include components of operating system 1310, applications 1320, and/or platform interface 112.

Memory 1304, according to some embodiments, is configured to store information within system 1300 during operation. Memory 1304 may refer to a non-transitory computer-readable storage medium or a computer-readable storage device. In some examples, memory 1304 is a temporary memory, meaning that a primary purpose of memory 1304 may not be long-term storage. Memory 1304 may also refer to a volatile memory, meaning that memory 1304 does not maintain stored contents when memory 1304 is not receiving power. Examples of volatile memories include RAM, DRAM, SRAM, and other forms of volatile memories known in the art. In some examples, memory 1304 is used to store program instructions for execution by processor 1302. Memory 1304, in one example embodiment, is used to temporarily store information during program execution.

One or more storage devices 1306 can also include one or more transitory or non-transitory computer-readable storage media and/or computer-readable storage devices. In some embodiments, storage devices 1306 may be configured to store greater amounts of information than memory 1304. Storage devices 1306 may further be configured for long-term storage of information. In some examples, storage devices 1306 include non-volatile storage elements. Examples of such non-volatile storage elements include magnetic hard discs, optical discs, solid-state discs, flash memories, forms of EPROM or EEPROM, and other forms of non-volatile memories known in the art. In one example, one or more storage devices 1306 can include databases 260, 270, 280 (i.e., they can store and maintain multiple dialog system rules, logs, context, etc.). In other embodiments, one or more storage devices 1306 can store and maintain user profiles and custom Dialog System Engines 120.

Still referencing FIG. 13, system 1300 includes network interface 1308. Network interface 1308 can be utilized to communicate with external devices, servers, and networked systems via one or more communications networks such as one or more wired, wireless, or optical networks including, for example, the Internet, intranet, LAN, WAN, cellular phone networks (e.g. GSM communications network, packet switching communications network, circuit switching communications network), Bluetooth radio, and an IEEE 802.11-based radio frequency network, among others. Network interface 1308 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as USB.

Operating system 1310 may control one or more functionalities of system 1300 or components thereof. For example, operating system 1310 may interact with platform interface 112, and may further facilitate one or more interactions between applications 1320 and one or more of processors 1302, memory 1304, storage devices 1306, and/or network interface 1308. As shown in FIG. 13, operating system 1310 may interact with or be otherwise coupled to platform interface 112 and components thereof. Notably, system 1300 and its components may also interact with one or more remote storage or computing resources 160 including, for example, web resources, web sites, social networking websites, blogging websites, news feeds, email servers, web calendars, event databases, ticket aggregators, map databases, points of interest databases, and so forth. Software applications 1320, in essence, may provide functionality to platform 110 and/or platform interface 112 and enable their operation. Alternatively, software applications may be additions to platform 110 and/or platform interface 112.

Figure 16:
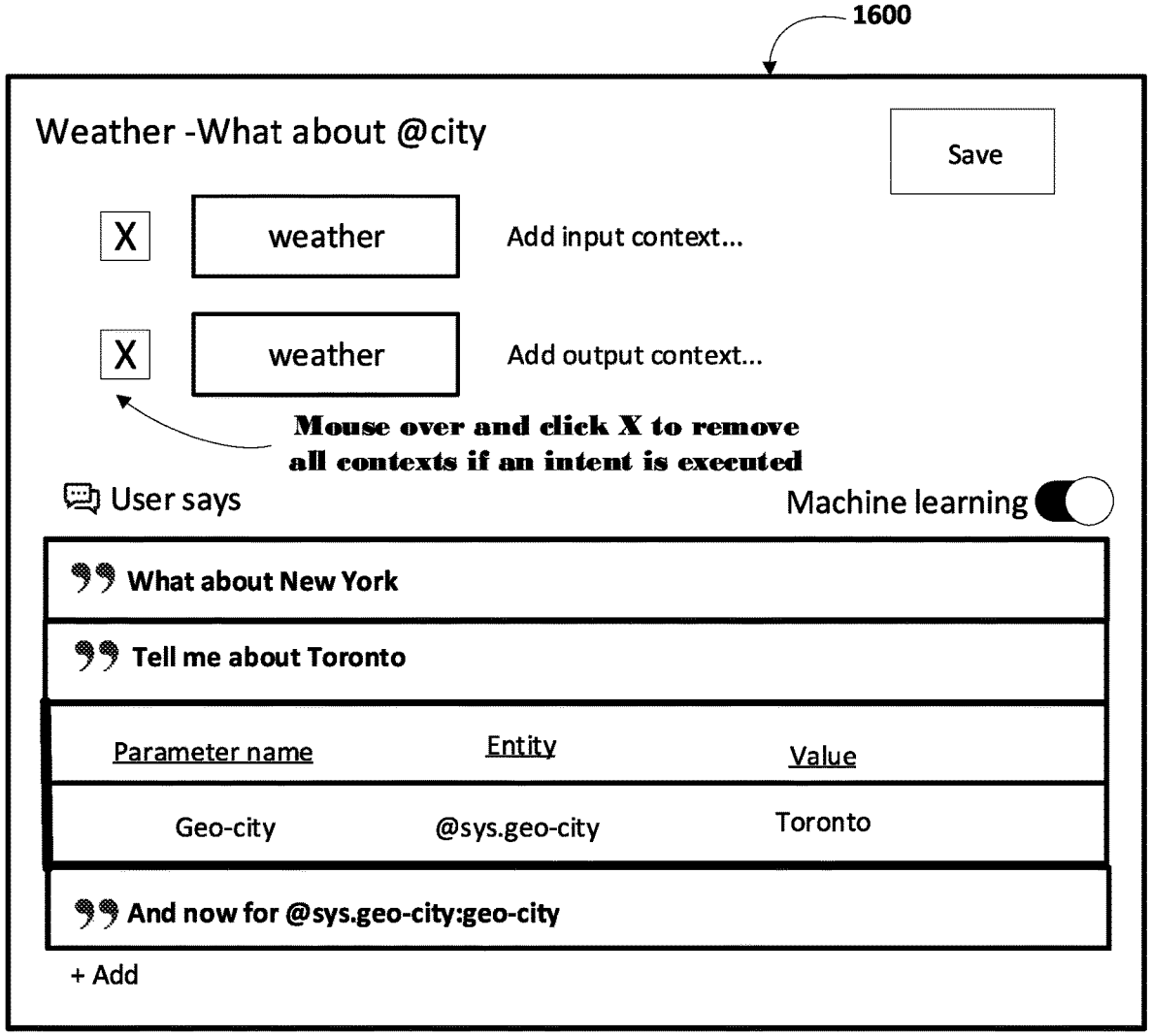
Figure 17:
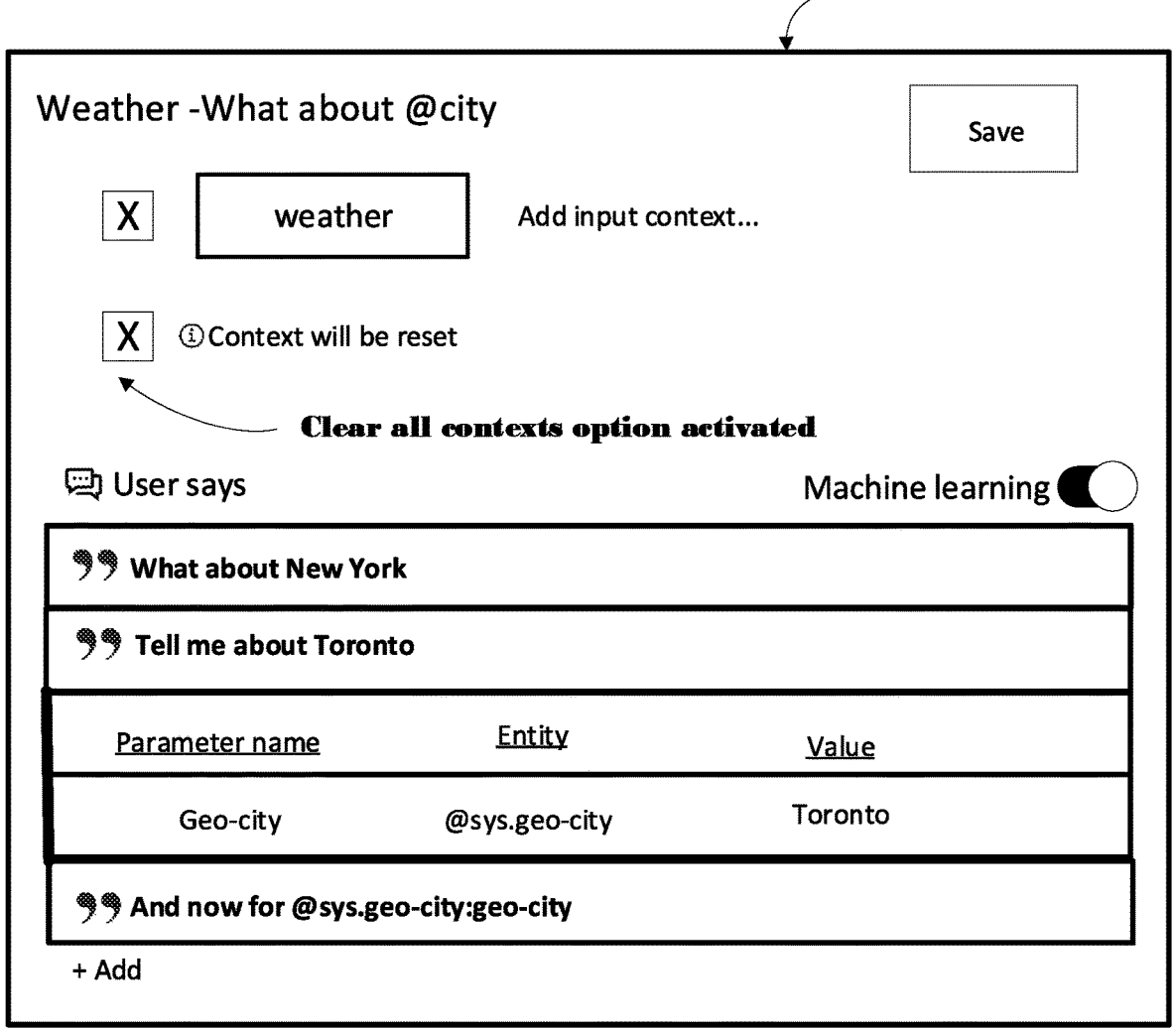
Figure 18:
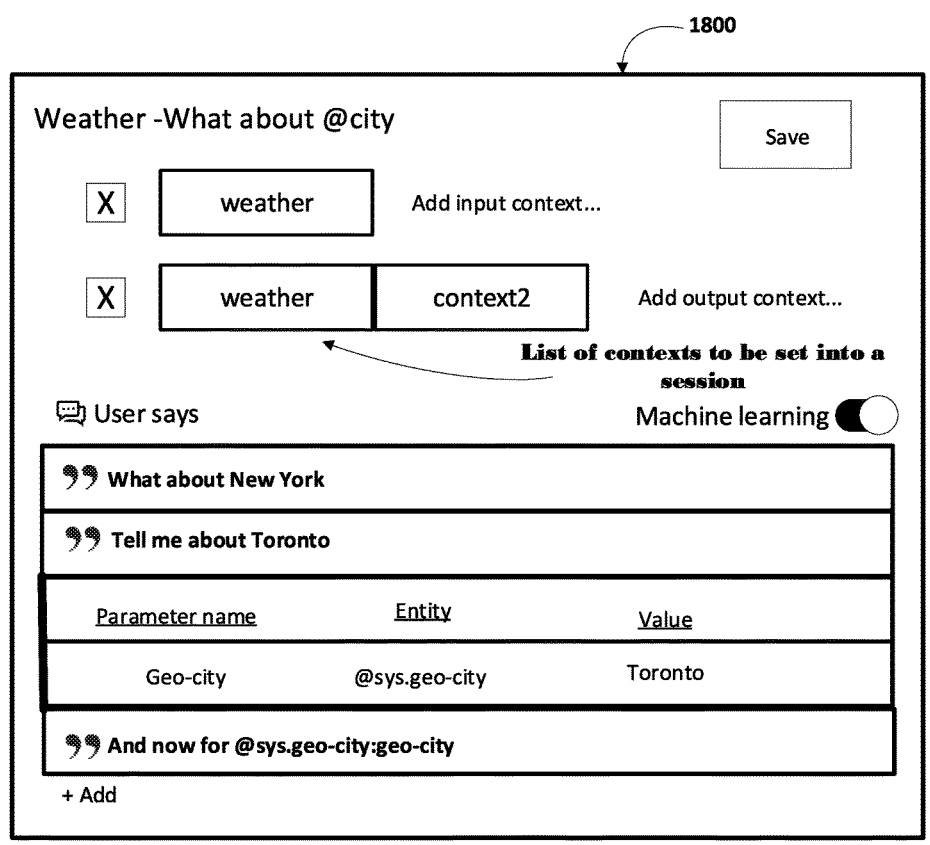

FIG. 14-18 show processes 1400, 1500, 1600, 1700, and 1800 for manual creation of contexts for a dialog system rule, in accordance with some example embodiments. As shown in FIG. 15, a developer may specify a context lifespan when performing requests. Setting lifespan to 0 implies removing a context for the rule. As shown in FIG. 16, the developer may remove all context if an intent is executed by placing mouse on the left of either input or output context and clicking on X sign. As shown in FIG. 17, the developer can be provided with an option to clear all contexts. This option can be activated upon removing of the output context. As shown in FIG. 18, the developer may provide a list of contexts to be set for a session.

Thus, methods for context-based NLP have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method implemented by one or more processors, the method comprising:
receiving at least one user request based on input provided by a user during a current user session via a dialog system interface, wherein the at least one user request includes speech input;
determining user request text for the at least one user request, wherein determining the user request text includes performing speech recognition to convert the speech input to the user request text;
determining an intent for the at least one user request based on the user request text;
determining, based on the user request text for the at least one user request, one or more conversational contexts for the current user session;
providing a fulfillment to the user request based on the intent, wherein the fulfillment satisfies the intent;
receiving, in response to providing the fulfillment to the user request, an additional user request based on additional input provided by the user during the current user session via the dialog system interface, wherein the additional user request includes additional speech input;
determining additional user request text for the additional user request, wherein determining the additional user request text includes performing speech recognition to convert the additional speech input to the additional user request text;
identifying, based on the additional user request text and based on one or more of the conversational contexts for the current user session, a given conversational context of the one or more conversational contexts for the additional user request;
selecting, from a plurality of dialog system rules, a given dialog system rule based on it being associated with the identified given conversational context; and
generating a response to the additional user request, generating the response to the additional user request comprising:
applying the given dialog system rule to at least a part of the additional user request text converted from the additional speech input.

2. The method of claim 1, further comprising:
delivering, via the Dialog System Interface, the response to the user request.

3. The method of claim 1, wherein the response includes building a route in a navigational software application.

4. The method of claim 1, wherein the response includes providing a clarifying question, the clarifying question being generated based on the dialog system rule.

5. The method of claim 1, further comprising:
pre-processing the user request by the Dialog System Interface.

6. The method of claim 1, wherein determining the one or more conversational contexts for current the user session is further based on at least one of:
a geographical location of the user,
a software application running on the user device,
a type of the user device,
weather conditions in the geographical location of the user, or
a physical condition of the user.

7. The method of claim 1, wherein determining the one or more conversational contexts for the current user session is further based on a software application running on the user device.

8. The method of claim 1, wherein determining the one or more conversational contexts for the current user session is further based on a physical condition of the user.

9. The method of claim 1, wherein the user request immediately precedes the additional user request during the current user session via the dialog system interface.

10. The method of claim 1, further comprising:
determining that the additional user request cannot be understood without the dialog system rule that is associated with the identified given conversational context;
wherein applying the given dialog system rule to the at least a part of the additional user request text converted from the additional speech input, in generating the response to the additional user request, is based on determining that the user request cannot be understood without the dialog system rule that is associated with the identified given conversational context.

11. A system, comprising:
one or more computers each including at least one processor and a memory storing processor-executable code, the one or more computers configured to:

maintain a plurality of dialog system rules;
receive at least one user request based on input provided by a user during a current user session via a dialog system interface, wherein the at least one user request includes speech input;
determine user request text for the at least one user request, wherein determining the user request text includes performing speech recognition to convert the speech input to the user request text;
determine an intent for the at least one user request based on the user request text;
determine, based on the user request text for the at least one user request, one or more conversational contexts for the current user session;
provide a fulfillment to the user request based on the intent, wherein the fulfillment satisfies the intent;
receive, in response to providing the fulfillment to the user request, an additional user request based on additional input provided by the user during the current user session via the dialog system interface, wherein the additional user request includes additional speech input;
determine additional user request text for the additional user request, wherein determining the additional user request text includes performing speech recognition to convert the additional speech input to the additional user request text;
identify, based on the additional user request text and based on one or more of the conversational contexts for the current user session, a given conversational context of the one or more conversational contexts for the additional user request;
select, from a plurality of dialog system rules, a given dialog system rule based on it being associated with the identified given conversational context; and
generate a response to the additional user request, generating the response to the additional user request comprising:
applying the given dialog system rule to at least a part of the additional user request text converted from the additional speech input.

12. The system of claim 11, wherein the one or more computers are further configured to:
deliver, via the Dialog System Interface, the response to the user request.

13. The system of claim 11, wherein the response includes building a route in a navigational software application.

14. The system of claim 11, wherein the response includes a clarifying question generated based on the dialog system rule.

15. The system of claim 11, wherein the user request is pre-processed by the Dialog System Interface.

16. The system of claim 11, wherein determining the one or more conversational contexts for the current user session is further based on at least one of:
a software application running on the user device,
a type of the user device,
weather conditions in the geographical location of the user, or
a physical condition of the user.

17. The system of claim 11, wherein determining the one or more conversational contexts for the user session is further based on a software application running on the user device.

18. The system of claim 11, wherein determining the one or more conversational contexts for the current user session is further based on a physical condition of the user.

19. The system of claim 11, wherein the user request immediately precedes the additional user request during the current user session via the dialog system interface.

20. A non-transitory processor-readable medium having instructions stored thereon, which when executed by one or more processors, cause the one or more processors to implement a method, comprising:
receiving at least one user request based on input provided by a user during a current user session via a dialog system interface, wherein the at least one user request includes speech input;
determining user request text for the at least one user request, wherein determining the user request text includes performing speech recognition to convert the speech input to the user request text;
determining an intent for the at least one user request based on the user request text;
determining, based on the user request text for the at least one user request, one or more conversational contexts for the current user session;
providing a fulfillment to the user request based on the intent, wherein the fulfillment satisfies the intent;
receiving, in response to providing the fulfillment to the user request, an additional user request based on additional input provided by the user during the current user session via the dialog system interface, wherein the additional user request includes additional speech input;
determining additional user request text for the additional user request, wherein determining the additional user request text includes performing speech recognition to convert the additional speech input to the additional user request text;
identifying, based on the additional user request text and based on one or more of the conversational contexts for the current user session, a given conversational context of the one or more conversational contexts for the additional user request;
selecting, from a plurality of dialog system rules, a given dialog system rule based on it being associated with the identified given conversational context; and
generating a response to the additional user request, generating the response to the additional user request comprising:
applying the given dialog system rule to at least a part of the additional user request text converted from the additional speech input.

* * * * *